US010400050B2

(12) United States Patent
Wendland et al.

(10) Patent No.: US 10,400,050 B2
(45) Date of Patent: Sep. 3, 2019

(54) METAL-CONTAINING POLYMERIC MATERIALS

(71) Applicant: 3M INNOVATIVE PROPERTIES COMPANY, St. Paul, MN (US)

(72) Inventors: Michael S. Wendland, North St. Paul, MN (US); Michael W. Kobe, Lake Elmo, MN (US); Duane D. Fansler, Dresser, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 86 days.

(21) Appl. No.: 15/570,935

(22) PCT Filed: May 5, 2016

(86) PCT No.: PCT/US2016/030974
§ 371 (c)(1),
(2) Date: Oct. 31, 2017

(87) PCT Pub. No.: WO2016/186858
PCT Pub. Date: Nov. 24, 2016

(65) Prior Publication Data
US 2018/0105628 A1 Apr. 19, 2018

Related U.S. Application Data

(60) Provisional application No. 62/298,089, filed on Feb. 22, 2016, provisional application No. 62/164,295, filed on May 20, 2015.

(51) Int. Cl.
| | | |
|---|---|---|
| *C08F 222/06* | (2006.01) | |
| *C08F 222/08* | (2006.01) | |
| *C08F 212/36* | (2006.01) | |
| *C08K 3/16* | (2006.01) | |
| *C08K 3/28* | (2006.01) | |
| *C08K 3/30* | (2006.01) | |
| *C08K 5/09* | (2006.01) | |
| *C08K 5/1535* | (2006.01) | |
| *C08K 5/34* | (2006.01) | |
| *B01J 20/22* | (2006.01) | |
| *B01J 20/26* | (2006.01) | |
| *C08K 5/16* | (2006.01) | |
| *C08K 5/17* | (2006.01) | |
| *C08K 5/22* | (2006.01) | |

(52) U.S. Cl.
CPC .......... *C08F 212/36* (2013.01); *B01J 20/223* (2013.01); *B01J 20/264* (2013.01); *B01J 20/265* (2013.01); *C08F 222/08* (2013.01); *C08K 3/16* (2013.01); *C08K 3/28* (2013.01); *C08K 3/30* (2013.01); *C08K 5/09* (2013.01); *C08K 5/1535* (2013.01); *C08K 5/16* (2013.01); *C08K 5/17* (2013.01); *C08K 5/22* (2013.01); *C08K 5/34* (2013.01); *C08K 2003/166* (2013.01); *C08K 2003/168* (2013.01); *C08K 2003/3045* (2013.01)

(58) Field of Classification Search
CPC .... C08F 212/36; C08F 222/08; C08F 222/06; C08F 220/66; C08F 226/08; B01J 20/26
See application file for complete search history.

(56) References Cited

U.S. PATENT DOCUMENTS

| | | | | |
|---|---|---|---|---|
| 2,471,818 A | * | 5/1949 | Hunter | C08F 222/08 |
| | | | | 521/30 |
| 3,332,890 A | | 7/1967 | Hatch | |
| 4,399,009 A | | 8/1983 | Chisholm | |
| 5,344,626 A | | 9/1994 | Abler | |
| 6,515,091 B2 | * | 2/2003 | Sanders | C05D 9/02 |
| | | | | 526/321 |
| 6,566,477 B2 | * | 5/2003 | Sanders | C05D 9/02 |
| | | | | 47/57.6 |
| 10,000,596 B2 | * | 6/2018 | Wendland | C08F 8/12 |
| 10,058,844 B2 | * | 8/2018 | Wendland | B01D 53/02 |
| 2008/0092744 A1 | | 4/2008 | Storbo | |
| 2016/0304645 A1 | | 10/2016 | Wendland | |
| 2016/0311996 A1 | * | 10/2016 | Wendland | C08F 212/36 |
| 2017/0182475 A1 | | 6/2017 | Wendland | |
| 2018/0105628 A1 | * | 4/2018 | Wendland | C08F 212/36 |
| 2018/0345246 A1 | * | 12/2018 | Wendland | B01J 20/264 |

FOREIGN PATENT DOCUMENTS

| | | |
|---|---|---|
| JP | S62-227957 | 10/1987 |
| WO | WO 1998/43738 | 10/1998 |

OTHER PUBLICATIONS

Maciejewska, M.; Szajnecki, L.; Gawdzik, B. J. Appl. Polym. Sci. 2012, 125, 300-307. (Year: 2012).*
Mendez, R.; Pillai, V.N.S. Talanta 1990, 6, 591-594. (Year: 1990).*
Mendez, R.; Pillai, V.N.S. Analyst, 1990, 115, 213-216. (Year: 1990).*
Annakutty, M.; Deb, P.C. J. Polym. Sci. Part A: Polym. Chem. 1996, 34, 1605-1607. (Year: 1996).*
Deb, P.C.; Rajput, L.D.; Agrawal, A.K.; Singh, P.K.; Hande, V.; Sasane, S. Polym. Adv. Technol. 2005, 16, 681-687. (Year: 2005).*
Ogawa, N.; Honmyo, K.; Harada, K.; Sugii, A. J. Appl. Polym. Sci. 1984, 29, 2851-2856. (Year: 1984).*

(Continued)

Primary Examiner — Rip A Lee
(74) Attorney, Agent, or Firm — Jean A. Lown

(57) ABSTRACT

Metal-containing polymeric materials and metal complex-containing polymeric materials are provided. The polymeric materials are divinylbenzene/maleic anhydride polymers, partially hydrolyzed divinylbenzene/maleic anhydride polymers, or fully hydrolyzed divinylbenzene/maleic anhydride polymers. Additionally, methods of making the metal-containing polymeric materials, methods of using the metal-containing polymeric materials to capture volatile, basic, nitrogen-containing compounds, and methods of using a zinc-containing polymeric material to detect the presence of water vapor are provided.

15 Claims, No Drawings

(56) References Cited

OTHER PUBLICATIONS

Maciejewska, "Investigation of the Surface Area and Polarity of Porous Copolymers of Maleic Anhydride and Divinylbezene", Journal of Applied Polymer Science, Jul. 2012, vol. 125, No. 1, pp. 300-307.

Deb, "Crosslinked Styrene-Maleic Acid Copolymer Complexes of Some Transition Metals and Their Adsorption Behavior", Polymers for Advanced Technologies, 2005, vol. 16, pp. 681-687.

Mathew, "Synthesis of Spherical Copolymer Beads of Styrene-Maleic Anhydride by Aqueous Suspension Polymerization", Journal of Polymer Science: Part A: Polymer Chemistry, 1996, vol. 34, pp. 1605-1607.

Ogawa, "Preparation of Spherical Polymer Beads of Maleic Anhydride-Styrene-Divinylbenzene and Metal Sorption of its Derivatives", Journal of Applied Polymer Science, 1984, vol. 29, pp. 2851-2856.

Petit, "Interactions of Ammonia with the Surface of Microporous Carbon Impregnated with Transition Metal Chlorides", Journal of Physical Chemistry C, 2007, vol. 111, pp. 12705-12714.

Sharonov, "Ammonia Adsorption by $MgCl_2$, $CaCl_2$ and $BaCl_2$ Confined to Porous Alumina: The Fixed Bed Adsorber", Reaction Kinetics and Catalysis Letters, 2005, vol. 85, No. 1, pp. 183-188.

Weston, "Removal of Airborne Toxic Chemicals by Porous Organic Polymers Containing Metal-Catecholates", Chemical Communications, The Royal Society of Chemistry, 2013, vol. 49, pp. 2995-2997.

International Search Report for PCT International Application No. PCT/US2016/030974, dated Jul. 5, 2016, 4 pages.

\* cited by examiner

METAL-CONTAINING POLYMERIC MATERIALS

CROSS REFERENCE TO RELATED APPLICATIONS

This application is a national stage filing under 35 U.S.C. 371 of PCT/US2016/030974, filed May 5, 2016, which claims the benefit of U.S. Provisional Application Nos. 62/298,089, filed Feb. 22, 2016, and 62/164,295, filed May 20, 2015, the disclosures of which are incorporated by reference in its/their entirety herein.

TECHNICAL FIELD

Metal-containing polymeric materials and methods of sorbing basic, nitrogen-containing compounds on the metal-containing polymeric materials are described.

BACKGROUND

Ammonia is a commonly used chemical and is present in many different environments. For example, ammonia is present at various manufacturing sites for use in a wide range of chemical reactions, on farms where anhydrous ammonia is used as a fertilizer or where animal excrement is present but ventilation may be inadequate, or in offices and homes from the use of ammonia-containing cleansers.

Ammonia vapors can pose a significant health risk. For example, in the United States, OSHA has set an eight hour exposure limit of 25 parts per million for ammonia vapor and NIOSH recently lowered the IDLH (immediately dangerous to life and health) level from 500 parts per million to 300 parts per million. That is, exposure to ammonia vapor at concentrations greater than 300 parts per million for 30 minutes can result in death or irreversible damage to health.

Because of both the prevalence and potential health risks of ammonia, various respiratory products have been developed to reduce exposure to this compound and to other volatile nitrogen-containing compounds such as amines. These respiratory products typically contain a sorbent that can capture ammonia or volatile amines and thereby remove them from the air. Activated carbons are the most commonly used sorbent. Activated carbons are microporous and are good sorbents for a variety of compounds such as volatile organic compounds (VOCs) through the mechanism of physisorption. Physisorbed compounds are adsorbed but do not chemically react with the surface of the activated carbons.

Unlike many volatile organic compounds, ammonia and volatile amines typically are not effectively captured by physisorption. Rather, ammonia and volatile amines are usually more effectively captured through chemisorption where the compounds chemically react with the sorbent itself or with a compound impregnated into the sorbent. Many efforts have been made to impregnate activated carbons with various materials that can react with ammonia and volatile amines. For example, activated carbon has been impregnated with various mineral acids such as sulfuric acid and phosphoric acid. The highly corrosive nature of these impregnated mineral acids make the manufacture of these sorbents difficult. These acidic impregnates are often replaced with metal salts such as metal chlorides or metal acetates. The capacities of the metal salt impregnated activated carbons can be comparable to mineral acid impregnated activated carbons.

Polymeric materials prepared from styrene or derivatives thereof, divinylbenzene, or mixtures thereof and maleic anhydride have been known for many years. Many of these polymeric materials are prepared by a process called macroreticulation, which refers to a process of making polymeric beads using suspension polymerization. These processes involve forming droplets of an organic phase suspended in an aqueous phase. The suspended organic phase includes the monomers and an optional porogen. The maleic anhydride content in the final polymer has been low, however, because this monomer tends to undergo hydrolysis and leave the organic phase. Attempts to reduce the hydrolysis reaction have included replacing the aqueous phase with glycerol or other polar solvents. Macroporous polymers have been prepared.

SUMMARY

Metal-containing polymeric materials and metal complex-containing polymeric materials are provided. The polymeric materials are divinylbenzene/maleic anhydride polymers, partially hydrolyzed divinylbenzene/maleic anhydride polymers, or fully hydrolyzed divinylbenzene/maleic anhydride polymers. Additionally, methods of making the metal-containing polymeric materials, methods of using the metal-containing polymeric materials to capture volatile, basic, nitrogen-containing compounds, and methods of using a zinc-containing polymeric material to detect the presence of water vapor are provided.

In a first aspect, a metal-containing polymeric material is provided that includes a) a polymeric material and b) a divalent metal incorporated into the polymeric material, wherein the divalent metal is present in an amount equal to at least 10 weight percent based on a total weight of the polymeric material (or at least 1.5 mmoles of divalent metal per gram of the polymeric material). The polymeric material contains i) 15 to 65 weight percent of a first monomeric unit that is of Formula (I),

Formula (II),

or a mixture thereof; ii) 30 to 85 weight percent of a second monomeric unit that is of Formula (III); and

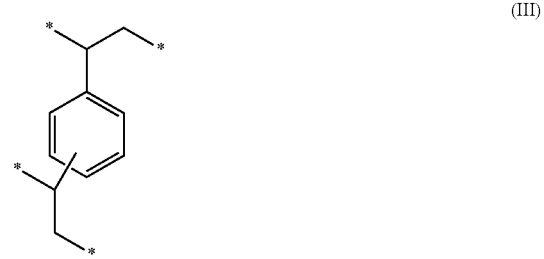

iii) 0 to 40 weight percent (or 5 to 40 weight percent) of a third monomeric unit that is of Formula (IV)

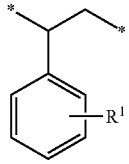
(IV)

wherein $R^1$ is hydrogen or alkyl. Each asterisk (*) in Formulas (I) to (IV) indicates the attachment sight to another monomeric unit or to a terminal group in the polymeric material.

In a second aspect, a method of capturing a basic, nitrogen-containing compound is provided. The method includes providing a metal-containing polymeric material as described above and then exposing the metal-containing polymeric material to the basic, nitrogen-containing compound. The basic, nitrogen-containing compound reacts with the divalent metal of the metal-containing polymeric material to form a metal complex.

In a third aspect, a metal complex-containing polymeric material is provided that includes a) a polymeric material and b) a metal complex incorporated into the polymeric material. The polymeric material contains i) 15 to 65 weight percent of a first monomeric unit that is of Formula (I),

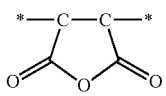
(I)

Formula (II),

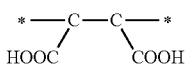
(II)

or a mixture thereof; ii) 30 to 85 weight percent of a second monomeric unit that is of Formula (III); and

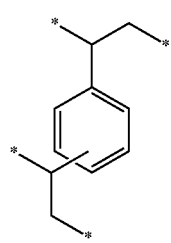
(III)

iii) 0 to 40 weight percent (or 5 to 40 weight percent) of a third monomeric unit that is of Formula (IV)

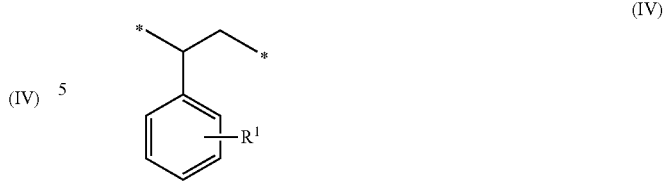
(IV)

wherein $R^1$ is hydrogen or alkyl. The metal complex contains a reaction product of a divalent metal and at least one basic, nitrogen-containing compound.

In a fourth aspect, a method of preparing a metal-containing polymer is provided. The method includes a) providing a polymeric material and b) sorbing a divalent metal on the polymeric material in an amount of 10 to 100 weight percent based on the weight of the polymeric material (or in a range of 1.5 to 15 mmoles of divalent metal per gram of the polymeric material). The polymeric material contains i) 15 to 65 weight percent of a first monomeric unit that is of Formula (I),

(I)

Formula (II),

(II)

or a mixture thereof; ii) 30 to 85 weight percent of a second monomeric unit that is of Formula (III); and

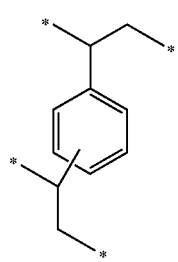
(III)

iii) 0 to 40 weight percent (or 5 to 40 weight percent) of a third monomeric unit that is of Formula (IV)

(IV)

wherein $R^1$ is hydrogen or alkyl.

In a fifth aspect, a method for detecting the presence of water vapor is provided. The method includes providing a metal-containing polymeric material as described above where the divalent metal is zinc (i.e., the metal-containing polymeric material is a zinc-containing polymeric material) and then exposing the zinc-containing polymeric material to water vapor. The color of the zinc-containing polymeric material changes after exposing the zinc-containing polymeric material to water vapor.

DETAILED DESCRIPTION

Metal-containing polymeric materials are provided. The polymeric materials are divinyl-benzene/maleic anhydride polymers, partially hydrolyzed divinylbenzene/maleic anhydride polymers, or fully hydrolyzed divinylbenzene/maleic anhydride polymers. The divalent metal is selected from Group 2 or Group 6 to Group 12 of the IUPAC Periodic Table. The metal-containing polymeric materials can be used to capture basic, nitrogen-containing compounds having a molecular weight no greater than 150 grams/mole. This capture results in the formation of the metal complex-containing polymeric materials. The metal-containing polymeric materials often change color upon exposure to basic, nitrogen-containing compounds.

Further, zinc-containing polymeric material are provided that can be used to capture water vapor or to indicate the presence of water vapor. The color of the zinc-containing polymeric material typically changes upon exposure to water vapor.

The term "a", "an", and "the" are used interchangeably with "at least one" to mean one or more of the elements being described.

The term "and/or" means either or both. For example "A and/or B" means only A, only B, or both A and B.

The term "divalent metal" refers to a metal having an oxidation state of +2. The divalent metal typically is from Group 2 or Groups 6 to 12 of the IUPAC Periodic Table of Elements. To avoid confusion, Group 2 has beryllium as its lightest member, Group 6 has chromium as its lightest member, Group 7 has manganese as its lightest member, Group 8 has iron as its lightest member, Group 9 has cobalt as its lightest member, Group 10 has nickel as its lightest member, Group 11 has copper as its lightest member, and Group 12 has zinc as its lightest member. The divalent metal can be in the form of a metal salt, a metal complex, a metal oxide, or the like.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "monomer mixture" refers to that portion of a polymerizable composition that includes the monomers. More specifically, the monomer mixture includes at least divinylbenzene and maleic anhydride. The term "polymerizable composition" includes all materials included in the reaction mixture used to form the polymeric material. The polymerizable composition includes, for example, the monomer mixture, the organic solvent, the initiator, and other optional components. Some of the components in the polymerizable composition such as the organic solvent may not undergo a chemical reaction but can influence the chemical reaction and the resulting polymeric material that is formed.

The term "divinylbenzene/maleic anhydride polymeric material" refers to a polymeric material derived from divinylbenzene, maleic anhydride, and optionally a styrene-type monomer. Styrene-type monomers are often present as impurities in divinylbenzene. Typically, the divinylbenzene/maleic anhydride polymeric material contain 15 to 65 weight percent monomeric units derived from maleic anhydride and 35 to 85 weight percent monomeric units derived from divinylbenzene or a mixture of divinylbenzene and styrene-type monomers. The monomeric units derived from maleic anhydride can be monomeric units of Formula (I), Formula (II), or a mixture thereof. That is, these monomeric units can have an anhydride group as in Formula (I) or two carboxyl groups as in Formula (II) depending on the extent that the polymeric material has been hydrolyzed.

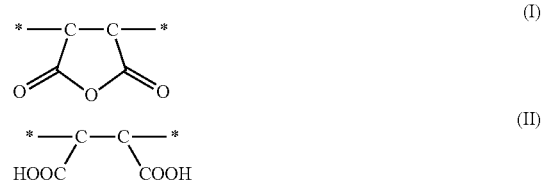

The monomeric units derived from divinylbenzene are of Formula (III) and those derived from styrene-type monomers are of Formula (IV).

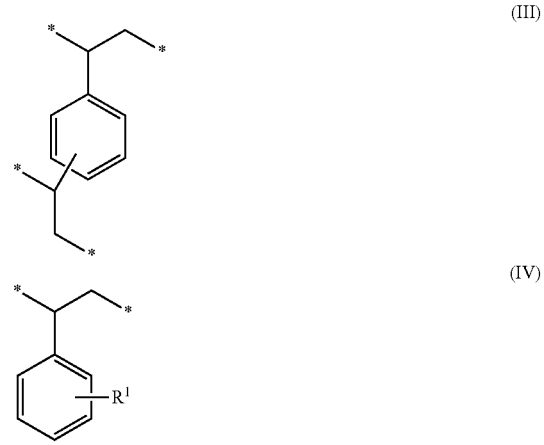

The polymeric material can be considered to be non-hydrolyzed, partially hydrolyzed, or fully hydrolyzed depending on the form of the monomeric unit derived from maleic anhydride. The polymeric material can be referred to as being "non-hydrolyzed" if 90 to 100 weight percent of the monomeric units derived from maleic acid are of Formula (I) and 0 to less than 10 weight percent of the monomeric units derived from maleic anhydride are of Formula (II). The polymeric material can be referred to as being "partially hydrolyzed divinylbenzene/maleic anhydride polymeric material" if 10 to 90 weight percent of the monomeric units derived from maleic anhydride are of Formula (I) and 10 to 90 weight percent of the monomeric units derived from maleic anhydride are of Formula (II). The polymeric material can be referred to as being "fully hydrolyzed divinylbenzene/maleic anhydride polymeric material" if 0 to less than 10 weight percent of the monomeric units derived from maleic anhydride are of Formula (I) and greater than 90 to 100 percent of the monomeric units derived from maleic anhydride are of Formula (II). Frequently, however, a polymeric material that is non-hydrolyzed or partially hydrolyzed prior to incorporation of divalent metal undergoes some hydrolysis during incorporation of the divalent metal. That is, incorporation of the divalent metal, which is usually done in an aqueous solution, can result in some hydrolysis of the polymeric material having monomer units of Formula (I). Incorporation of the divalent metal can change a non-hydrolyzed divinylbenzene/maleic anhydride polymeric material to a partially hydrolyzed divinylbenzene/maleic anhydride polymeric material or can further hydrolyze a partially hydrolyzed divinylbenzene/maleic anhydride polymeric material.

The term "styrene-type monomer" refers to styrene, an alkyl substituted styrene (e.g., ethyl styrene), or mixtures thereof. These monomers are often present in divinylbenzene as impurities.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (i.e., 77° K) over a range of relative pressures. The term "BET specific surface area" is the surface area per gram of a material that is typically calculated from adsorption isotherm data of the inert gas over a relative pressure range of 0.05 to 0.3 using the BET method (Brunauer-Emmett-Teller Method).

The term "room temperature" refers to a temperature in a range of 20° C. to 30° C. or in a range of 20° C. to 25° C.

The polymeric material is prepared from divinylbenzene, maleic anhydride, and an optional styrene-type monomer. The resulting non-hydrolyzed divinylbenzene/maleic anhydride polymeric material can then be treated with divalent metal. Alternatively, all or any portion of the anhydride groups in the non-hydrolyzed divinylbenzene/maleic anhydride polymeric material can be treated with a hydrolyzing agent to prepare a partially hydrolyzed divinylbenzene/maleic anhydride polymeric material or fully hydrolyzed divinylbenzene/maleic anhydride polymeric material that is then treated with the divalent metal.

The polymeric material that is subsequently incorporated with divalent metal is typically porous. More specifically, the amount of divinylbenzene crosslinker, the amount of maleic anhydride, the amount of optional styrene-type monomer, and the organic solvent used to prepare the non-hydrolyzed polymeric material are carefully selected to prepare polymeric materials that are porous. Porous materials can be characterized based on the size of their pores. The term "micropores" refers to pores having a diameter of less than 2 nanometers. The term "mesopores" refers to pores having a diameter in a range of 2 to 50 nanometers. The term "macropores" refers to pores having a diameter greater than 50 nanometers. In particular, the polymeric materials, at least prior to incorporation of the divalent metal, usually have pores in the size range of micropores and/or mesopores.

The porosity of the polymeric material can be characterized from an adsorption isotherm of an inert gas such as nitrogen or argon by the porous material under cryogenic conditions. The adsorption isotherm is typically obtained by measuring adsorption of the inert gas by the porous material at multiple relative pressures in a range of about $10^{-6}$ to about 0.98. The isotherms are then analyzed using various methods to calculate specific surface areas (such as BET specific surface area) and total pore volume. The conditions used to synthesize the non-hydrolyzed divinylbenzene/maleic anhydride polymeric material are selected to produce metal-containing polymeric materials having a BET surface area equal to at least 15 $m^2$/gram, at least 20 $m^2$/gram, at least 25 $m^2$/gram, or at least 50 $m^2$/gram.

The non-hydrolyzed divinylbenzene/maleic anhydride polymeric material is synthesized from a monomer mixture of maleic anhydride, divinylbenzene, and an optional styrene-type monomer. Typically, the divinylbenzene/maleic anhydride polymeric material contain 15 to 65 weight percent monomeric units derived from maleic anhydride and 35 to 85 weight percent monomeric units derived from divinylbenzene or a mixture of divinylbenzene and styrene-type monomers. More particularly, the monomer mixture used to form the non-hydrolyzed divinylbenzene/maleic anhydride typically includes 1) 15 to 65 weight percent maleic anhydride, 2) 30 to 85 weight percent divinylbenzene, and 3) 0 to 40 weight percent (or 5 to 40 weight percent) of a styrene-type monomer, wherein the styrene-type monomer is styrene, an alkyl substituted styrene, or a combination thereof. The amount of each monomer is based on the total weight of monomers in the monomer mixture.

The amount of maleic anhydride used in the monomer mixture to prepare the non-hydrolyzed polymeric material effects the amount of divalent metal that can be incorporated into the polymeric material. If the amount of maleic anhydride is too low (e.g., below 15 weight percent of the monomers in the monomer mixture), the amount of divalent metal in the metal-containing polymeric material may be too low to effectively and efficiently capture basic, nitrogen-containing compounds of formula Q. On the other hand, if the amount of maleic anhydride is greater than 65 weight percent or 60 weight percent based on the total weight of monomers in the monomer mixture, the polymeric material may not have a sufficiently high BET specific surface area. If the BET specific surface area is too low, the polymeric material may not have sufficient porosity to incorporate a suitable amount of divalent metal.

In some embodiments, the amount of maleic anhydride in the monomer mixture is at least 15 weight percent, at least 20 weight percent, at least 25 weight percent, at least 30 weight percent, at least 35 weight percent, or at least 40 weight percent. The amount of maleic anhydride can be up to 65 weight percent, up to 62 weight percent, up to 61 weight percent, up to 60 weight percent, up to 55 weight percent, up 50 weight percent, up to 45 weight percent, or up to 40 weight percent. For example, the amount can be in a range of 15 to 65 weight percent, 15 to 60 weight percent, 20 to 60 weight percent, 25 to 60 weight percent, 30 to 60 weight percent, 35 to 60 weight percent, 40 to 60 weight percent, 15 to 55 weight percent, 15 to 50 weight percent, 15 to 45 weight percent, 20 to 50 weight percent, 20 to 45 weight percent, 25 to 50 weight percent, or 25 to 45 weight percent. The amounts are based on the total weight of monomers in the monomer mixture.

Stated differently, the polymeric material contains 15 to 65 weight percent monomeric units derived from maleic anhydride. The monomeric units derived from maleic anhydride are of Formula (I), Formula (II), or both. The relative amounts of Formula (I) and Formula (II) can vary depending on the degree of hydrolysis that has occurred. The amount of the monomeric units derived from maleic anhydride can be, for example, in a range of 15 to 60 weight percent, 20 to 60 weight percent, 25 to 60 weight percent, 30 to 60 weight percent, 35 to 60 weight percent, 40 to 60 weight percent, 15 to 55 weight percent, 15 to 50 weight percent, 15 to 45 weight percent, 20 to 50 weight percent, 20 to 45 weight percent, 25 to 50 weight percent, or 25 to 45 weight percent based on a total weight of the polymeric material.

The amount of divinylbenzene crosslinker can strongly influence the BET specific surface area of the divinylbenzene/maleic anhydride polymeric material whether it is non-hydrolyzed, partially hydrolyzed, or fully hydrolyzed. The divinylbenzene contributes to the high crosslink density and to the formation of a rigid polymeric material having micropores and/or mesopores. The BET specific surface area tends to increase with an increase in the amount of divinylbenzene in the monomer mixture. If the amount of divinylbenzene in the monomer mixture is less than 30 weight percent, the polymeric material may not have a sufficiently high BET specific surface area, particularly if the polymeric material is fully hydrolyzed. On the other hand, if the amount of divinylbenzene is greater than 85 weight percent, the anhydride and/or carboxylic acid content may be insufficient to incorporate the desired amount of the divalent metal.

In some embodiments, the amount of divinylbenzene is at least 30 weight percent, at least 35 weight percent, at least 40 weight percent, at least 45 weight percent, at least 50 weight percent, at least 55 weight percent, or at least 60 weight percent. The amount of divinylbenzene can be up to 85 weight percent, up to 80 weight percent, up to 75 weight percent, up to 70 weight percent, or up to 65 weight percent. For example, the divinylbenzene can be in a range of 30 to 85 weight percent, 30 to 80 weight percent, 30 to 75 weight percent, 30 to 70 weight percent, 30 to 60 weight percent, 30 to 55 weight percent, 30 to 50 weight percent, 40 to 80 weight percent, 50 to 80 weight percent, 40 to 75 weight percent, 50 to 75 weight percent, or 55 to 75 weight percent. The amounts are based on the total weight of monomers in the monomer mixture.

Stated differently, the polymeric material contains 30 to 85 weight percent of monomeric units derived from divinylbenzene. The amount of the monomeric unit derived from divinylbenzene can be, for example, in a range of 30 to 80 weight percent, 30 to 75 weight percent, 30 to 70 weight percent, 30 to 60 weight percent, 30 to 55 weight percent, 30 to 50 weight percent, 40 to 80 weight percent, 50 to 80 weight percent, 40 to 75 weight percent, 50 to 75 weight percent, or 55 to 75 weight percent. The amounts are based on the total weight of the polymeric material.

Divinylbenzene can be difficult to obtain in a pure form. For example, divinylbenzene is often commercially available with purity as low as 55 weight percent. Obtaining divinylbenzene with purity greater than about 80 weight percent can be expensive. The impurities accompanying divinylbenzene are typically styrene-type monomers such as styrene, alkyl substituted styrene (e.g., ethyl styrene), or mixtures thereof. Thus, styrene-type monomers are often present in the monomer mixture along with divinylbenzene and maleic anhydride. The monomer mixture typically contains 0 to 40 weight percent (or 5 to 40 weight percent) styrene-type monomers based on a total weight of monomers in the monomer mixture. If the content of the styrene-type monomer is greater than 40 weight percent, the crosslink density may be too low and/or the distance between crosslinks may be too large to provide a polymeric material with the desired BET specific surface area. This is particularly the situation if the polymeric material is fully hydrolyzed. As the crosslink density decreases, the resulting polymeric material tends to be less rigid and less porous.

In some embodiments, the amount of styrene-type monomers is at least 1 weight percent, at least 2 weight percent, at least 5 weight percent, or at least 10 weight percent. The amount of styrene-type monomer can be up to 40 weight percent, up to 35 weight percent, up to 30 weight percent, or up to 25 weight percent. For example, the amount of styrene-type monomer in the monomer mixture can be in a range of 0 to 40 weight percent, 1 to 40 weight percent, 5 to 40 weight percent, 1 to 30 weight percent, 5 to 30 weight percent, 1 to 20 weight percent, 5 to 20 weight percent, 5 to 15 weight percent, 10 to 40 weight percent, or 10 to 30 weight percent. The amounts are based on the total weight of monomers in the monomer mixture.

Stated differently, the polymeric material can contain 0 to 40 weight percent of monomeric units derived from styrene-type monomers. For example, the amount can be in a range of 1 to 40 weight percent, 5 to 40 weight percent, 1 to 30 weight percent, 5 to 30 weight percent, 1 to 20 weight percent, 5 to 20 weight percent, 5 to 15 weight percent, 10 to 40 weight percent, or 10 to 30 weight percent. The amounts are based on the total weight of the polymeric material.

Overall, the monomer mixture includes 15 to 65 weight percent maleic anhydride based on a total weight of monomers in the monomer mixture, 30 to 85 weight percent divinylbenzene based on the total weight of monomers in the monomer mixture, and 0 to 40 weight percent (or 5 to 40 weight percent) styrene-type monomer based on the total weight of monomers in the monomer mixture. In other embodiments, the monomer mixture contains 25 to 60 weight percent maleic anhydride, 30 to 75 weight percent divinylbenzene, and 1 to 30 weight percent styrene-type monomer. In other embodiments, the monomer mixture contains 30 to 60 weight percent maleic anhydride, 30 to 60 weight percent divinylbenzene, and 5 to 20 weight percent styrene-type monomer. In still other embodiments, the monomer mixture contains 40 to 60 weight percent maleic anhydride, 30 to 50 weight percent divinylbenzene, and 5 to 15 weight percent styrene-type monomer.

The monomer mixture typically contains at least 95 weight percent monomers selected from maleic anhydride, divinylbenzene, and styrene-type monomer. For example, at least 97 weight percent, at least 98 weight percent, at least 99 weight percent, at least 99.5 weight percent, or at least 99.9 weight percent of the monomers in the monomer mixture are selected from maleic anhydride, divinylbenzene, and styrene-type monomer. In many embodiments, the only monomers purposefully added to the monomer mixture are maleic anhydride and divinylbenzene with any other monomers being present (including the styrene-type monomers) as impurities in the maleic anhydride and the divinylbenzene.

That is, the polymeric material typically contains 15 to 65 weight percent monomeric units derived from maleic anhydride, 30 to 85 weight percent monomeric units derived from divinylbenzene, and 0 to 40 weight percent (or 5 to 40 weight percent) monomeric units derived from styrene-type monomers. In other embodiments, the polymeric material contains 25 to 60 weight percent monomeric units derived from maleic anhydride, 30 to 75 weight percent monomeric units derived from divinylbenzene, and 1 to 30 weight percent (or 10 to 30 weight percent) monomeric units derived from styrene-type monomers. In other embodiments, the polymeric material contains 30 to 60 weight percent monomeric units derived from maleic anhydride, 30 to 65 weight percent monomeric units derived from divinylbenzene, and 5 to 20 weight percent (or 10 to 20 weight percent) monomeric units derived from styrene-type monomer. In still other embodiments, the polymeric material contains 40 to 60 weight percent monomeric units derived from maleic anhydride, 30 to 55 weight percent monomeric units derived from divinylbenzene, and 5 to 20 weight percent (or 10 to 20 weight percent) monomeric units derived from styrene-type monomers.

In addition to the monomer mixture, the polymerizable composition used to form the non-hydrolyzed divinylbenzene/maleic anhydride polymeric material includes an organic solvent. The polymerizable composition is a single phase prior to polymerization. Stated differently, prior to polymerization, the polymerizable composition is not a suspension. The organic solvent is selected to dissolve the monomers included in the monomer mixture and to solubilize the polymeric material as it begins to form.

The organic solvent can function as a porogen as the divinylbenzene/maleic anhydride polymeric material is formed. The organic solvent choice can strongly influence the BET specific surface area and the size of the pores formed in the non-hydrolyzed polymeric material. Using organic solvents that are miscible with both the monomers and the forming polymer tend to result in the formation of polymeric material having micropores and mesopores. Good solvents for the monomers and the forming polymer tend to result in a larger fraction of the porosity of the final polymeric material being in the form of micropores and mesopores.

Organic solvents that can dissolve both the monomers and the forming polymeric material include, but are not limited to, ketones, esters, acetonitrile, and mixtures thereof. Other organic solvents can be added along with one or more of these organic solvents provided that the resulting non-hydrolyzed polymeric material has a BET specific surface area equal to at least 100 $m^2$/gram. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tert-butyl acetate.

The organic solvent can be used in any desired amount. The polymerizable compositions often have percent solids in a range of 1 to 70 weight percent. If the percent solids are too low, the polymerization time may become undesirably long. The percent solids are often at least 1 weight percent, at least 2 weight percent, at least 5 weight percent, at least 10 weight percent, or at least 15 weight percent. If the percent solids are too great, however, the monomers do not form a single phase with the organic solvent. Further, increasing the percent solids tends to result in the formation of larger diameter pores and as a result the polymeric material tends to have a lower BET specific surface area. The percent solids can be up to 70 weight percent, up to 65 weight percent, up to 60 weight percent, up to 50 weight percent, up to 40 weight percent, up to 30 weight percent, or up to 25 weight percent. For example, the percent solids can be in a range of 5 to 70 weight percent, 5 to 60 weight percent, 10 to 60 weight percent, 20 to 60 weight percent, or 25 to 50 weight percent.

In addition to the monomer mixture and organic solvent, the polymerizable compositions typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature. In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 weight percent, 0.05 to 8 weight percent, 0.05 to 5 weight percent, 0.1 to 10 weight percent, 0.1 to 8 weight percent, 0.1 to 5 weight percent, 0.5 to 10 weight percent, 0.5 to 8 weight percent, 0.5 to 5 weight percent, 1 to 10 weight percent, 1 to 8 weight percent, or 1 to 5 weight percent. The weight percent is based on a total weight of monomers in the polymerizable composition.

Suitable thermal initiators include organic peroxides and azo compounds. Example azo compounds include, but are not limited to, those commercially available under the trade designation VAZO from E. I. du Pont de Nemours Co. (Wilmington, Del.) such as VAZO 64 (2,2'-azobis(isobutyronitrile)), which is often referred to as AIBN, and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the thermal initiator is often in a range of 25° C. to 160° C., in a range of 30° C. to 150° C., in a range of 40° C. to 150° C., in a range of 50° C. to 150° C., in a range of 50° C. to 120° C., or in a range of 50° C. to 110° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF6^-$, $AsF6^-$, and $SbF6^-$. Suitable metal ions include, for example, ions of Group 3 metals, transition metals, and lanthanide metals. Specific metal ions include, but are not limited to, Fe(III), Co(III), Ag(I), Ag(II), Cu(II), Ce(III), Al (III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 weight percent, less than 0.3 weight percent, less than 0.2 weight percent, less than 0.1 weight percent, less than 0.05 weight percent, or less than 0.01 weight percent surfactant based on the total weight of the polymerizable composition. The absence of a surfactant is advantageous because these materials tend to restrict access to and, in some cases, fill micropores and mesopores in a porous material. The presence of a surfactant could reduce the capacity of the metal-containing polymeric material to adsorb low molecular weight basic molecules.

When the polymerizable composition is heated in the presence of a free radical initiator, polymerization of the monomers in the monomer mixture occurs. By balancing the amounts of each monomer in the monomer mixture and by selection of an organic solvent that can solubilize all of the monomers and the growing polymeric material during its early formation stage, a non-hydrolyzed polymeric material can be prepared that has a BET specific surface area equal to at least 100 m²/gram. The BET specific surface area of the non-hydrolyzed polymer can be at least 150 m²/gram, at least 200 m²/gram, at least 250 m²/gram, or at least 300 m²/gram. The BET specific surface area can be, for example, up to 1000 m²/gram or higher, up to 900 m²/gram, up to 800 m²/gram, up to 750 m²/gram, or up to 700 m²/gram.

The high BET specific surface area is at least partially attributable to the presence of micropores and/or mesopores in the non-hydrolyzed divinylbenzene/maleic anhydride polymeric material. The argon adsorption isotherms of the non-hydrolyzed divinylbenzene/maleic anhydride polymeric materials indicate that there is considerable adsorption at relative pressures below 0.1, which suggests that micropores are present. There is an increase in adsorption at higher relative pressures up to about 0.95. This increase is indicative of a wide distribution of mesopores. In some embodiments, at least 20 percent of the BET specific surface area is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent or higher, or up to 75 percent or higher.

The non-hydrolyzed divinylbenzene/maleic anhydride polymeric material is granular and can be used directly as the polymeric material used to incorporate a divalent metal forming the metal-containing polymeric material. Alternatively, the non-hydrolyzed polymeric material can be treated with a hydrolyzing agent to provide a partially or fully hydrolyzed divinylbenzene/maleic anhydride polymeric material. The hydrolyzing agent reacts with the maleic anhydride units resulting in the formation of two carboxylic acid groups (—COOH groups). Any suitable hydrolyzing agent can be used that can react with the anhydride group (—(CO)—O—(CO)—) of the maleic anhydride units. In many embodiments, the hydrolyzing agent is a base such as a basic material dissolved in water. One example basic material is an alkali metal hydroxide such as sodium hydroxide (e.g., an aqueous solution of sodium hydroxide). Alternatively, the hydrolyzing agent could be water alone at elevated temperatures (e.g., above room temperature to boiling) or a dilute acid at slightly elevated temperatures (e.g., above room temperature to about 80° C.). In many embodiments, the preferred hydrolyzing agent is a base such as an alkali metal hydroxide. The non-hydrolyzed divinylbenzene/maleic anhydride polymeric material is mixed with a solution of alkali metal hydroxide dissolved in water or an alcohol such as methanol. The mixture is heated at a temperature near 80° C. for several hours (e.g., 4 to 12 hours). The hydrolyzed polymeric material can then be treated with hydrochloric acid to convert any carboxylate salts to carboxylic acid groups.

Stated in terms of the monomeric units present in the non-hydrolyzed, partially hydrolyzed, or fully hydrolyzed anhydride polymeric material, the polymeric material contains i) 15 to 65 weight percent of a first monomeric unit that is of Formula (I),

Formula (II),

or a mixture thereof; ii) 30 to 85 weight percent of a second monomeric unit that is of Formula (III); and

iii) 0 to 40 weight percent (or 5 to 40 weight percent) of a third monomeric unit that is of Formula (IV)

wherein $R^1$ is hydrogen or alkyl. Formula (I) corresponds to a non-hydrolyzed monomeric unit derived from maleic anhydride. This non-hydrolyzed monomeric unit contains an anhydride group (—(CO)—O—(CO)—). Formula (II) corresponds to a hydrolyzed monomeric unit derived from maleic anhydride. The hydrolyzed monomeric unit has two carboxylic acid groups (—(CO)OH) rather than an anhydride group. Formula (III) corresponds to a monomeric unit derived from divinylbenzene. The two alkylene groups attached to the aromatic ring can be in a meta- or para-position to each other. Formula (IV) is for a styrene-type monomeric unit. The group $R^1$ is hydrogen or an alkyl (e.g., an alkyl with 1 to 4 carbon atoms or 2 carbon atoms). In many embodiments $R^1$ is ethyl and the monomeric unit of Formula (IV) is derived from ethyl styrene, an impurity often present in divinylbenzene. The $R^1$ group is often in a meta- or para-position relative to the alkylene group attached to the aromatic ring. Each asterisk (*) in Formulas (I) to (IV) indicates the attachment sight to another monomeric unit or to a terminal group in the polymeric material. The amounts of each of the first, second, and third monomeric units are the same as described above for the amounts of each monomer used to form the non-hydrolyzed divinylbenzene/maleic anhydride polymeric material.

If either partially or fully hydrolyzed, the polymeric material contains carboxylic acid groups. If the pH is sufficiently high, the polymeric material can be negatively charged. Typically, the polymeric material itself does not have any positively charged groups.

The hydrolyzed (e.g., fully hydrolyzed) divinylbenzene/maleic anhydride polymeric material has a BET specific surface area less than that of the non-hydrolyzed divinylbenzene/maleic anhydride polymeric material. The opening of the anhydride group may sufficiently increase the conformational freedom in the backbone resulting in decreased porosity. In addition, hydrogen bonding between carboxylic acids in the hydrolyzed material may possibly restrict or block access to pores. The BET specific surface area of the hydrolyzed polymeric material is often about 30 to 80 percent, 30 to 60 percent, 40 to 80 percent, or 40 to 60 percent of the BET specific surface area of the non-hydrolyzed polymeric material. Because of this decrease, it is often desirable to prepare a non-hydrolyzed divinylbenzene/maleic anhydride polymeric material having the highest possible BET specific surface area yet having sufficient maleic anhydride units to allow adequate incorporation of the divalent metal.

The hydrolyzed (e.g., fully hydrolyzed) divinylbenzene/maleic anhydride polymeric material typically has a BET specific surface area equal to at least 50 $m^2$/gram or at least 100 $m^2$/gram. In some embodiments, the BET specific surface area is at least 150 $m^2$/gram, at least 175 $m^2$/gram, at least 200 $m^2$/gram, at least 225 $m^2$/gram, at least 250 $m^2$/gram, or at least 300 $m^2$/gram. The BET specific surface area can be up to 600 $m^2$/gram or higher, up to 500 $m^2$/gram, or up to 400 $m^2$/gram. In some embodiments, the BET specific surface area is in a range of 50 to 600 $m^2$/gram, in a range of 75 to 600 $m^2$/gram, in a range of 100 to 600 $m^2$/gram, or in a range of 200 to 600 $m^2$/gram.

The argon adsorption isotherms of the hydrolyzed (e.g., fully hydrolyzed) divinylbenzene/maleic anhydride polymeric materials indicate that there is some adsorption at relative pressures below 0.1, which suggests that micropores are present. There is an increase in adsorption at higher relative pressures up to about 0.95. This increase is indicative of a wide distribution of mesopores. In some embodiments, at least 20 percent of the BET specific surface area is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent, or higher, or up to 75 percent or higher. In many embodiments, the BET specific surface area is attributable mainly to the presence of mesopores.

After formation of the polymeric material (i.e., non-hydrolyzed, partially hydrolyzed, or fully hydrolyzed divinylbenzene/maleic anhydride polymeric material), a divalent metal is incorporated into the polymeric material. The divalent metal is typically incorporated by treating the polymeric material with a solution of a metal salt dissolved in water. The metal salt contains a cation that is the divalent metal (i.e., a metal with a +2 oxidation state) and an anion. Suitable metal ions (divalent metals) are typically from Group 2 or Groups 6 to 12 of the periodic table. Example divalent metals include, but are not limited to, chromium, nickel, cobalt, copper, zinc, manganese, cadmium, iron, magnesium, calcium, barium, or a mixture thereof. In many embodiments, the divalent metal is a Group 6 to 12 metal such as, for example, chromium, nickel, cobalt, copper, zinc, iron, or a mixture thereof. In some particular embodiments, the divalent metal is copper, cobalt, zinc, or nickel. In some even more particular embodiments, the divalent metal is zinc or copper.

The metal salts are typically selected from those that are soluble in water. The anion of the metal salt is often a halide (e.g., chloride), nitrate, sulfate, carboxylate (e.g., acetate, formate, and propanoate), or halogen-substituted carboxylates (e.g., chloroacetate, dichloroacetate, and chloro-substituted propanoate). In many embodiments, the anion is chloride, acetate, or nitrate.

Examples of specific metal salts include, but are not limited to, zinc acetate, copper acetate, nickel acetate, cobalt acetate, iron acetate, manganese acetate, chromium acetate, cadmium acetate, zinc formate, copper formate, nickel formate, cobalt formate, iron formate, manganese formate, cadmium formate, zinc propanoate, copper propanoate, nickel propanoate, cobalt propanoate, iron propanoate, manganese propanoate, cadmium propanoate, zinc chloroacetate, copper chloroacetate, nickel chloroacetate, cobalt chloroacetate, iron chloroacetate, manganese chloroacetate, cadmium chloroacetate, zinc dichloroacetate, copper dichloroacetate, nickel dichloroacetate, cobalt dichloroacetate, iron dichloroacetate, manganese dichloroacetate, cadmium dichloroacetate, zinc chloride, copper chloride, nickel chloride, cobalt chloride, iron chloride, manganese chloride, cadmium chloride, chromium chloride, magnesium chloride, zinc sulfate, copper sulfate, nickel sulfate, cobalt sulfate, iron sulfate, manganese sulfate, cadmium sulfate, zinc nitrate, copper nitrate, nickel nitrate, cobalt nitrate, iron nitrate, and the like.

The divalent metal is typically incorporated by treating the polymeric material with a solution of the metal salt dissolved in water. The concentrations of the metal salt solutions are often in a range of 0.1 to 10 moles/liter. In some embodiments, the concentration is in a range of 0.5 to 10 moles/liter, in a range of 1 to 10 moles/liter, in a range of 1 to 8 moles/liter, in a range of 2 to 8 moles/liter, or in a range of 3 to 6 moles/liter. The resulting solution is mixed with the polymeric material. The amount of metal salt is typically added such that the moles of divalent metal are in excess compared to the moles of anhydride, carboxyl groups (—COOH groups), or both in the polymeric material.

The mixing time of the metal salt solution with the polymeric material is often up to 1 hour, up to 2 hours, up to 4 hours, up to 8 hours, up to 16 hours, up to 24 hours, or up to 48 hours. The mixing temperature can be at room temperature or above. The metal-containing polymeric material is then separated from the water and dried. Any suitable method of drying can be used. In some embodiments, the metal-containing polymeric material is dried under vacuum in an oven set at 80° C. to 120° C. The process of incorporation of the divalent metal into non-hydrolyzed polymeric material or partially hydrolyzed polymeric materials may result in some hydrolysis or further hydrolysis of at least a portion of the anhydride groups.

In some embodiments, the resulting metal-containing polymeric material contains at least 10 weight percent of the divalent metal based on a total weight of the polymeric material. The amount of the divalent metal can be at least 15 weight percent, at least 20 weight percent, at least 25 weight percent, at least 30 weight percent, at least 40 weight percent, or at least 50 weight percent based on a total weight of the polymeric material. The metal-containing polymeric material can include up to 100 weight percent or more of the divalent metal (i.e., the weight of the divalent metal can be equal to or exceed the weight of the polymeric material). For example, the amount can be up to 90 weight percent, up to 80 weight percent, up to 75 weight percent, up to 70 weight percent, up to 60 weight percent, or up to 50 weight percent based on the total weight of the polymeric material. For example, the amount is often in a range of 10 to 100 weight percent, 10 to 80 weight percent, 10 to 60 weight percent, 10 to 50 weight percent, 10 to 40 weight percent, 10 to 30 weight percent, 15 to 60 weight percent, 15 to 50 weight percent, 15 to 40 weigh percent, 15 to 30 weight percent, 20 to 60 weight percent, 20 to 50 weight percent, 20 to 40 weight percent or 20 to 30 weight percent.

In other embodiments or stated differently, the resulting metal-containing polymeric material contains at least 1.5 mmoles (millimoles) of the divalent metal per gram of the polymeric material. The amount of the divalent metal can be at least 2.0 mmoles, at least 2.25 mmoles, at least 3.0 mmoles, at least 3.75 mmoles, at least 4.0 mmoles, at least 4.5 mmoles, at least 5 mmoles, at least 6.0 mmoles, at least 7 mmoles, or at least 7.5 mmoles per gram of the polymeric material. The metal-containing polymeric material can include up to 15 mmoles or more of the divalent metal per gram. For example, the amount can be up to 14 mmoles, up to 13.5 mmoles, up to 13 mmoles, up to 12 mmoles, up to 11.25 mmoles, up to 11 mmoles, up to 10.5 mmoles, up to 10 mmoles, up to 9 mmoles, up to 8 mmoles, or up to 7.5 mmoles per gram of the polymeric material. For example, the amount is often in a range of 1.5 to 15 mmoles, 1.5 to 12 mmoles, 1.5 to 9 mmoles, 1.5 to 7.5 mmoles, 1.5 to 6 mmoles, 1.5 to 4.5 mmoles, 2.25 to 9 mmoles, 2.25 to 7.5 mmoles, 2.25 to 6 mmoles, 2.25 to 5 mmoles, 2.25 to 4.5 mmoles, 3.0 to 9 mmoles, 3.0 to 7.5 mmoles, 3.0 to 6 mmoles, or 3.0 to 4.5 mmoles per gram of the polymeric material.

In summary, the metal-containing polymeric material includes a) a polymeric material and b) a divalent metal incorporated into (i.e., sorbed on) the polymeric material in an amount equal to at least 10 weight percent based on the weight of the polymeric material (or at least 1.5 mmoles per gram of the polymeric material). The polymeric material contains i) 15 to 65 weight percent of a first monomeric unit that is of Formula (I),

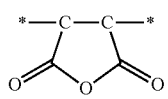

Formula (II),

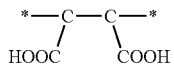

or a mixture thereof; ii) 30 to 85 weight percent of a second monomeric unit that is of Formula (III); and

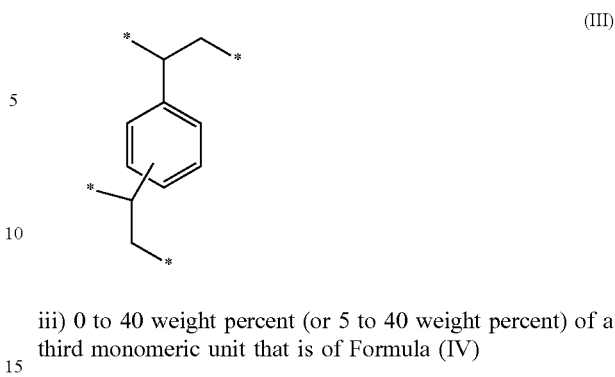

iii) 0 to 40 weight percent (or 5 to 40 weight percent) of a third monomeric unit that is of Formula (IV)

wherein $R^1$ is hydrogen or alkyl.

In some embodiments, the metal-containing polymeric material further includes an acid-base indicator. The acid-base colorimetric indicator (i.e., a dye (typically an organic dye) that changes color when it undergoes a transition from being in an acidic form to being in a basic form) is often added at the same time as the divalent metal. The acid-base colorimetric indicator is typically selected such that the basicity of the nitrogen-containing compound being sorbed is sufficient to shift the acid-base colorimetric indicator from its acidic form to its basic form.

A further consideration in the selection of the appropriate acid-base colorimetric indicator involves choosing an acid-base indicator that has a sufficiently lower affinity for the nitrogen-containing compound than the divalent metal such that the acid-base indicator does not change color until all or nearly all of the nitrogen-containing compound sorptive capacity of the divalent metal is exhausted. That is, the acid-base colorimetric indicator is selected to change from a first color to a second color when all or a significant portion of the available divalent metal atoms have had their sorptive capacity for nitrogen-containing compounds exhausted. The change in color then signals that the capacity of the polymeric sorbent for sorption of nitrogen-containing compounds has been reached or is close to being reached. As used herein, the term "close to being reached" means that at least 60 percent or more of the capacity has been reached (i.e., a least 60 percent or more of the available sorption sites have been used for sorption of a nitrogen-containing compound). For example, at least 70 percent, at least 80 percent, at least 90 percent, or at least 95 percent of the sorption sites have been used for sorption of a nitrogen-containing compound.

A final consideration in selecting an acid-base colorimetric indicator involves taking into account the color inherent to the metal-containing polymeric material. Some divalent metals when incorporated into the porous polymeric material impart the resulting metal-containing polymeric material with a color (i.e., $ZnCl_2$ metal-containing polymeric material is pink, $CuCl_2$ metal-containing polymeric material is dark gray/green and the $NiCl_2$ metal-containing polymeric material is tan). Selection of an acid-base colorimetric indicator whose color change from its acidic form to its basic form is obvious in light of the color change that may be inherent from the metal-containing polymeric material itself can be important. It can be advantageous to add an acid-base indicator even to metal-containing polymeric materials which inherently undergo a color change upon sorption of nitrogen-containing compounds in order to access a wider range of colors for the colorimetric indication, and in some cases, to mitigate the moisture sensitivity of the color shift of some metal-containing polymeric materials.

Example acid-base colorimetric indicators include, but are not limited to, methyl red, bromoxylenol blue, pararosaniline, chrysoidine, thymol blue, methyl yellow, bromophenyl blue, Congo red, methyl orange, bromocresol green, azolitmin, bromocresol purple, bromothymol blue, phenol red, neutral red, naphtholphthalein, cresol red, phenolphthalein, and thymolphthalein. The acid-base colorimetric indicators can be added to the polymeric sorbent using any suitable method. In some embodiments, the polymeric sorbent is soaked in a solution of the acid-base colorimetric indicator for at least 10 minutes, at least 20 minutes, at least 30 minutes, at least 1 hour, at least 2 hours, at least 4 hours, or at least 8 hours. The solution of the acid-base colorimetric indicator is often in a concentration range of 1 to 10 milligrams per milliliter. Often, about 0.5 grams of the polymeric sorbent is soaked in about 10 milliliters of the solution.

Although the polymeric material can be non-hydrolyzed, partially hydrolyzed, or fully hydrolyzed, in some applications it may be preferable to use fully hydrolyzed polymeric material. The hydrolyzed polymeric material may perform more consistently than either the non-hydrolyzed or partially hydrolyzed polymeric materials because such materials may change with time (i.e., they have a tendency to undergo hydrolysis or further hydrolysis that may alter their performance characteristics).

In some embodiments such as with zinc-containing, cobalt-containing, nickel-containing, and magnesium-containing polymeric materials, the divalent metal may be present as an ionic species. For divalent metal that is ionic, a crystalline phase that includes the metal species usually cannot be detected when the metal-containing polymeric materials are analyzed using x-ray diffraction. In other embodiments such as with copper-containing polymeric materials, the divalent metal may be present as an oxide. For metal oxides, a crystalline phase may be detected when the metal-containing polymeric materials are analyzed using x-ray diffraction.

When analyzed using infrared spectroscopy, a shift in the carbonyl peak can be observed for the polymeric material after incorporation of the divalent metal. While not wanting to be bound by theory, it is believed that the divalent metal may be associated with (i.e., the metal may interact with or may coordinate with) the carboxyl groups or anhydride groups in the polymeric material.

Some of the metal-containing polymeric materials can be colored. Some colored examples include, but are not limited to, those containing zinc (II), copper (II), and nickel (II). Zinc containing-polymeric materials are often pink, copper-containing polymeric materials are often a dark grayish-green, and nickel-containing polymeric materials are often tan.

The metal-containing polymeric materials typically have a lower BET specific surface area than the corresponding polymeric material. The divalent metal resides in the pores of the polymeric material resulting in a decrease in the BET specific surface area. In many embodiments, the BET surface area is at least 15 m$^2$/gram, at least 20 m$^2$/gram, at least 25 m$^2$/gram, at least 30 m$^2$/gram, at least 40 m$^2$/gram, or at least 50 m$^2$/gram.

After formation and drying, the metal-containing polymeric material can be used to capture vapors of basic, nitrogen-containing compounds. Thus, a method of capturing a basic, nitrogen-containing compound is provided. The method includes providing the metal-containing polymeric material as described above and then exposing the metal-containing polymeric material to vapors of the basic, nitrogen-containing compound of formula Q. A metal complex is formed. The metal complex includes the reaction product of the divalent metal as defined above and at least one compound of formula Q.

The basic nitrogen-containing compounds of formula Q that react with the divalent metal to form a metal complex can be classified as Lewis bases, Bronsted-Lowry bases, or both. Suitable basic nitrogen-containing compounds often have a low molecular weight (e.g., no greater than 150 grams/mole). That is, the basic, nitrogen-containing compounds can be volatile at or near room temperature or can be volatile under conditions of use. Examples of basic, nitrogen-containing compounds include, but are not limited to, ammonia, hydrazine compounds, amine compounds (e.g., alkyl amines, dialkylamines, triaalkylamines, alkanolamines, alkylene diamines, arylamines), and nitrogen-containing heterocyclic (saturated and unsaturated) compounds. Specific basic nitrogen-containing compounds include, for example, ammonia, hydrazine, methylhydrazine, methylamine, dimethylamine, trimethylamine, ethylamine, diethylamine, triethylamine, propylamine, dipropylamine, tripropylamine, isopropylamine, diisopropylamine, triisopropylamine, ethanolamine, cyclohexylamine, morpholine, pyridine, benzylamine, phenylhydrazine, ethylene diamine, and 1,3-propane diamine.

After exposure to vapors of the basic, nitrogen-containing compound, the metal-containing polymeric material is converted to a metal complex-containing polymeric material. The metal complex-containing polymeric material includes a) a polymeric material and b) a metal complex incorporated into (i.e., sorbed on) the polymeric material. The polymeric material contains i) 15 to 65 weight percent of a first monomeric unit that is of Formula (I),

Formula (II),

or a mixture thereof; ii) 30 to 85 weight percent of a second monomeric unit that is of Formula (III); and

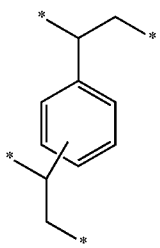

(III)

iii) 0 to 40 weight percent (or 5 to 40 weight percent) of a third monomeric unit that is of Formula (IV)

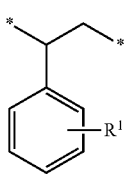

(IV)

wherein $R^1$ is hydrogen or alkyl. The metal complex includes a reaction product of a divalent metal and at least one basic, nitrogen-containing compound.

In many embodiments of the metal complex-containing polymeric material, divalent metal incorporated into the polymeric material remains that has not been converted to a metal complex. That is, the metal complex-containing polymeric material includes a mixture of divalent metal that is not complexed with the basic, nitrogen-containing compound and divalent metal that is complexed with at least one basic, nitrogen-containing compound.

The total amount of divalent metal (whether it is complexed or not with the basic, nitrogen-containing compound) is at least 10 weight percent based on a total weight of the polymeric material. The total amount of the divalent metal can be at least 20 weight percent, at least 25 weight percent, at least 30 weight percent, at least 40 weight percent, or at least 50 weight percent based on a total weight of the polymeric material. The amount can be up to 100 weight percent or more. For example, the amount can be up to 90 weight percent, up to 80 weight percent, up to 75 weight percent, up to 70 weight percent, up to 60 weight percent, or up to 50 weight percent based on the total weight of the polymeric material. For example, the amount is often in a range of 10 to 100 weight percent, 10 to 80 weight percent, 10 to 60 weight percent, 10 to 50 weight percent, 10 to 40 weight percent, 10 to 30 weight percent, 15 to 60 weight percent, 15 to 50 weight percent, 15 to 40 weigh percent, 15 to 30 weight percent, 20 to 60 weight percent, 20 to 50 weight percent, 20 to 40 weight percent or 20 to 30 weight percent.

Stated differently, the total amount of divalent metal (whether it is complexed or not with the basic, nitrogen-containing compound) is at least 1.5 mmoles per gram of the polymeric material. The total amount of the divalent metal can be at least 3.0 mmoles, at least 3.75 mmoles, at least 4.5 mmoles, at least 6 mmoles, or at least 7.5 mmoles per gram of the polymeric material. The total amount of the divalent metal can be up to 15 mmoles per gram or more. For example, the amount can be up to 13.5 mmoles, up to 12 mmoles, up to 11.25 mmoles, up to 10.5 mmoles, up to 9 mmoles, or up to 7.5 mmoles per gram of the polymeric material. For example, the total amount of divalent metal can be in a range of 1.5 to 15 mmoles, 1.5 to 12 mmoles, 1.5 to 9 mmoles, 1.5 to 7.5 mmoles, 1.5 to 6 mmoles, 1.5 to 4.5 mmoles, 2.25 to 9 mmoles, 2.25 to 7.5 mmoles, 2.25 to 6 mmoles, 2.25 to 5 mmoles, 2.25 to 4.5 mmoles, 3.0 to 9 mmoles, 3.0 to 7.5 mmoles, 3.0 to 6 mmoles, or 3.0 to 4.5 mmoles per gram of the polymeric material.

The maximum amount of basic, nitrogen-containing compounds sorbed (e.g., complexed) by the metal-containing polymeric material is related to the amount of divalent metal incorporated into the polymeric material. The maximum amount of basic, nitrogen-containing compound sorbed is often at least 0.5 milliequivalents per gram of metal-containing polymeric material (i.e., 0.5 milliequivalents of the sorbed basic, nitrogen-containing compound per gram of metal-containing polymeric material) and can be up to 10 milliequivalents per gram or even higher. In many embodiments, the maximum amount sorbed is at least 1 milliequivalents per gram, at least 2 milliequivalents per gram, or at least 3 milliequivalents per gram. The amount sorbed can be, for example, up to 9 milliequivalents per gram, up to 8 milliequivalents per gram, up to 7 milliequivalents per gram, up to 6 milliequivalents per gram, or up to 5 milliequivalents per gram.

Although the amount of divalent metal in the metal-containing polymeric material is an important factor for maximizing the capacity for sorption of basic, nitrogen-containing compounds, an upper amount of divalent metal is reached beyond which the capacity does not continue to increase. That is, beyond a certain point, incorporating more divalent metal into the metal-containing polymeric materials does not result in increased capacity for basic, nitrogen-containing compounds. If the amount of divalent metal incorporated is too large, the surface of the polymeric material may become saturated with the divalent metal and clustering and/or layering of the divalent metal may result. The clustering and/or layering may lead to a decreased amount of the divalent metal being available for coordination with (i.e., complexing with) the basic, nitrogen-containing compounds. Thus, the amount of divalent metal incorporated into the polymeric material can be optimized to obtain maximum sorption capacity for the basic, nitrogen-containing compounds.

The porosity of the polymeric material also affects the capacity of the metal-containing material for sorption of basic, nitrogen-containing compounds. Typically, polymeric materials with higher porosity have greater accessibility to functional group sites. Higher porosity polymeric materials, probably due to the presence of mesopores and/or micropores in the polymeric material, typically lead to higher incorporation of divalent metal. Higher incorporation of divalent metal (at least up the point where clustering and/or layering occurs) results in more coordination sites available for sorption of the basic, nitrogen-containing compounds. The porosity and BET specific surface area of the polymeric material can be altered by the amount of crosslinking (i.e., the amount of divinylbenzene) used to prepare the polymeric materials as well as the identity and amount of organic solvent present during formation of the polymeric materials.

In some embodiments, only a portion of the divalent metal in the metal-containing polymeric materials is complexed with the basic, nitrogen-containing compound of formula Q. That is, the maximum amount of Q is not sorbed. In this situation, the polymeric materials contain both a metal complex and divalent metal that is not complexed to the basic, nitrogen-containing compound.

Any method of capturing (i.e., sorbing) the basic, nitrogen-containing compound of formula Q on the metal-containing polymeric material can be used. The method can be used, for example, to determine if there has been any exposure to ammonia or to another basic, nitrogen-containing compound of formula Q. The capture can occur, for example, within a sensor component used to detect the presence or absence of the basic, nitrogen-containing compound. More specifically, the metal-containing polymeric material can be part of the sensor component. The sensor can be positioned where detection of basic, nitrogen-containing compound is desired.

In some embodiments, particularly if the divalent metal in the metal-containing polymeric material is selected from zinc, nickel, or copper, a color change occurs upon exposure to a basic, nitrogen-containing compound. For example, zinc-containing polymeric materials change from pink to tan, copper-containing polymeric materials change from dark grayish green to turquoise, and nickel-containing polymeric materials change from tan to olive green upon exposure to basic, nitrogen-containing compounds. This color change can be used to indicate exposure to the basic, nitrogen-containing compounds. The intensity of the color after exposure to the basic, nitrogen-containing compound may be related to the amount of exposure.

In addition to colorimetric methods of detecting exposure to the basic, nitrogen-containing compounds, other analytical techniques can be used. For example, the metal-containing polymeric material can be analyzed for nitrogen content. As another example, the presence of the basic nitrogen-containing material may be detected by thermogravimetric analysis (e.g., the weight loss of the basic nitrogen-containing compound can be detected as the temperature is increased).

Besides being useful for capturing basic, nitrogen-containing compounds of formula Q, zinc-containing polymeric materials can be used for detecting the presence of (or exposure to) water vapor. The method includes providing a zinc-containing polymeric material as described above where the divalent metal is Zn(II) and then exposing the zinc-containing polymeric material to water vapor (such as water in air or in a gaseous composition). The color of the zinc-containing polymeric material changes from pink to tan after exposure to water vapor. The zinc-containing polymeric material can be used as an indicator in desiccants or used in humidity indicator cards in place of the commonly used cobalt chloride, which is carcinogenic. The maximum amount of water vapor sorbed is comparable to the maximum amount of volatile basic, nitrogen-containing compound that can be sorbed by the zinc-containing polymeric material.

Various embodiments are provided that are a metal-containing polymeric material, a method of capturing a basic, nitrogen-containing compound, a metal complex-containing polymeric material, a method of preparing a metal-containing compound, a method of preparing a metal complex-containing polymeric material, and a method of detecting the presence of water vapor.

Embodiment 1A is a metal-containing polymeric material that includes a) a polymeric material and b) a divalent metal incorporated into the polymeric material, wherein the divalent metal is present in an amount equal to at least 10 weight percent based on a total weight of the polymeric material (or at least 1.5 mmoles per gram of the polymeric material). The polymeric material contains i) 15 to 65 weight percent of a first monomeric unit that is of Formula (I),

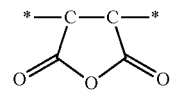

Formula (II),

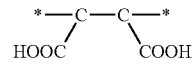

or a mixture thereof; ii) 30 to 85 weight percent of a second monomeric unit that is of Formula (III); and

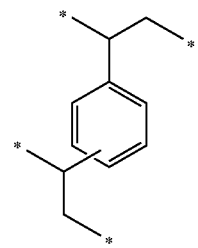

iii) 0 to 40 weight percent (or 5 to 40 weight percent) of a third monomeric unit that is of Formula (IV)

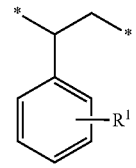

wherein $R^1$ is hydrogen or alkyl. Each asterisk (*) in Formulas (I) to (IV) indicates the attachment sight to another monomeric unit or to a terminal group in the polymeric material.

Embodiment 2A is the metal-containing polymeric material of embodiment 1A, wherein the amount of the divalent metal incorporated into the polymeric material is in a range of 10 to 100 weight percent based on the weight of the polymeric material (or in a range of 1.5 to 15 mmoles per gram of the polymeric material).

Embodiment 3A is the metal-containing polymeric material of embodiment 1A or 2A, wherein the divalent metal is from a Group 2 or Group 6 to 12 metal of the IUPAC Periodic Table of Elements.

Embodiment 4A is the metal-containing polymeric material of any one of embodiments 1A to 3A, wherein the divalent metal is from a Group 6 to 12 metal of the IUPAC Periodic Table of Elements.

Embodiment 5A is the metal-containing polymeric material of any one of embodiments 1A to 4A, wherein the divalent metal is copper, cobalt, zinc, or nickel.

Embodiment 6A is the metal-containing polymeric material of any one of embodiments 1A to 5A, wherein the divalent metal is zinc or copper.

Embodiment 7A is the metal-containing polymeric material of any one of embodiments 1A to 6A, wherein the divalent metal is zinc.

Embodiment 8A is the metal-containing polymeric material of any one of embodiments 1A to 7A, wherein the polymeric material comprises i) 25 to 60 weight percent monomeric units of Formula (I), Formula (II), or a mixture thereof, ii) 30 to 75 weight percent monomeric units of Formula (III), and 1 to 30 weight percent (or 10 to 30 weight percent) monomeric units of Formula (IV).

Embodiment 9A is the metal-containing polymeric material of any one of embodiments 1A to 8A, wherein the polymeric material comprises i) 30 to 60 weight percent monomeric units of Formula (I), Formula (II), or a mixture thereof, ii) 30 to 65 weight percent monomeric units of Formula (III), and iii) 5 to 20 weight percent (or 10 to 20 weight percent) monomeric units of Formula (IV).

Embodiment 10A is the metal-containing polymeric material of any one of embodiments 1A to 9A, wherein the polymeric material comprises i) 40 to 60 weight percent monomeric units of Formula (I), Formula (II), or a mixture thereof, ii) 30 to 55 weight percent monomeric units of Formula (III), and 5 to 20 weight percent (or 10 to 20 weight percent) monomeric units of Formula (IV).

Embodiment 11A is the metal-containing polymeric material of any one of embodiments 1A to 10A, wherein the metal-containing polymeric material has a BET specific surface area equal to at least 15 m²/gram or at least 25 m²/gram.

Embodiment 12A is the metal-containing polymeric material of any one of embodiments 1A to 11A, wherein the metal-containing polymeric material sorbs an amount of the basic, nitrogen-containing compound of formula Q in a range of 0.5 to 10 milliequivalents per gram of metal-containing polymeric material.

Embodiment 13A is the metal-containing polymeric material of any one of embodiments 1A to 12A, wherein the metal-containing polymeric material further comprises an acid-base colorimetric indicator.

Embodiment 1B is method of capturing a basic, nitrogen-containing compound. The method includes providing a metal-containing polymeric material and then exposing the metal-containing polymeric material to vapors of the basic, nitrogen-containing compound. The basic, nitrogen-containing compound reacts with the divalent metal of the metal-containing polymeric material to form a metal complex. The metal-containing polymeric material includes a) a polymeric material and b) a divalent metal incorporated into the polymeric material, wherein the divalent metal is present in an amount equal to at least 10 weight percent based on a total weight of the polymeric material (or at least 1.5 mmoles per gram of the polymeric material). The polymeric material contains i) 15 to 65 weight percent of a first monomeric unit that is of Formula (I),

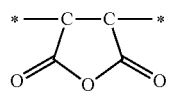

Formula (II),

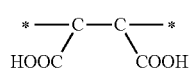

or a mixture thereof; ii) 30 to 85 weight percent of a second monomeric unit that is of Formula (III); and

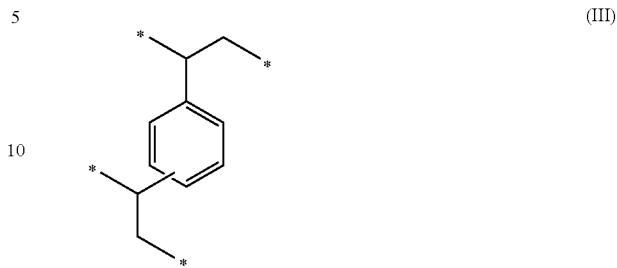

iii) 0 to 40 weight percent (or 5 to 40 weight percent) of a third monomeric unit that is of Formula (IV)

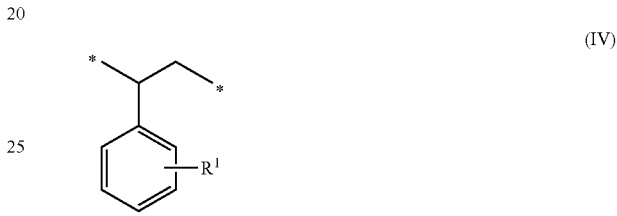

wherein $R^1$ is hydrogen or alkyl. Each asterisk (*) in Formulas (I) to (IV) indicates the attachment sight to another monomeric unit or to a terminal group in the polymeric material.

Embodiment 2B is the method of embodiment 1B, wherein the amount of the divalent metal incorporated into the polymeric material is in a range of 10 to 100 weight percent based on the weight of the polymeric material (or in a range of 1.5 to 15 mmoles per gram of the polymeric material).

Embodiment 3B is the method of embodiment 1B or 2B, wherein the divalent metal is from a Group 2 or Group 6 to 12 metal of the IUPAC Periodic Table of Elements.

Embodiment 4B is the method of any one of embodiments 1B to 3B, wherein the divalent metal is from a Group 6 to 12 metal of the IUPAC Periodic Table of Elements.

Embodiment 5B is the method of any one of embodiments 1B to 4B, wherein the divalent metal is copper, cobalt, zinc, or nickel.

Embodiment 6B is the method of any one of embodiments 1B to 5B, wherein the divalent metal is zinc or copper.

Embodiment 7B is the method of any one of embodiments 1B to 6B, wherein the divalent metal is zinc.

Embodiment 8B is the method of any one of embodiments 1B to 7B, wherein the polymeric material comprises i) 25 to 60 weight percent monomeric units of Formula (I), Formula (II), or a mixture thereof, ii) 30 to 75 weight percent monomeric units of Formula (III), and 1 to 30 weight percent (or 10 to 30 weight percent) monomeric units of Formula (IV).

Embodiment 9B is the method of any one of embodiments 1B to 8B, wherein the polymeric material comprises i) 30 to 60 weight percent monomeric units of Formula (I), Formula (II), or a mixture thereof, ii) 30 to 65 weight percent monomeric units of Formula (III), and iii) 5 to 20 weight percent (or 10 to 20 weight percent) monomeric units of Formula (IV).

Embodiment 10B is the method of any one of embodiments 1B to 9B, wherein the polymeric material comprises i) 40 to 60 weight percent monomeric units of Formula (I), Formula (II), or a mixture thereof, ii) 30 to 55 weight percent monomeric units of Formula (III), and 5 to 20 weight percent (or 10 to 20 weight percent) monomeric units of Formula (IV).

Embodiment 11B is the method of any one of embodiments 1B to 10B, wherein the metal-containing polymeric material has a BET specific surface area equal to at least 15 m²/gram or at least 25 m²/gram.

Embodiment 12B is the method of any one of embodiments 1B to 11B, wherein the metal-containing polymeric material changes color upon exposing the metal-containing polymeric material to the basic, nitrogen-containing compound of formula Q.

Embodiment 13B is the method of any one of embodiments 1B to 12B, wherein the basic, nitrogen-containing compound of formula Q has a molecular weight no greater than 150 grams/mole.

Embodiment 14B is the method of any one of embodiments 1B to 13B, wherein the basic, nitrogen-containing compound of formula Q is ammonia, a hydrazine compound, an amine compound, or a nitrogen-containing heterocyclic compound.

Embodiment 15B is the method of any one of embodiments 1B to 14B, wherein the basic, nitrogen-containing compound of formula Q is ammonia, hydrazine, methylhydrazine, methylamine, dimethylamine, trimethylamine, ethylamine, diethylamine, trimethylamine, propylamine, dipropylamine, tripropylamine, isopropylamine, diisopropylamine, triisopropylamine, ethanolamne, cyclohexylamine, morpholine, pyridine, benzylamine, phenylhydrazine, ethylene diamine, 1,3-propane diamine, or a mixture thereof.

Embodiment 16B is the method of any one of embodiments 1B to 15B, wherein the basic, nitrogen-containing compound is sorbed in an amount equal to at least 0.5 milliequivalents per gram of metal-containing polymeric material.

Embodiment 17B in the method of any one of embodiments 1B to 16B, wherein the basic, nitrogen-containing compound is sorbed in an amount that is in a range of 0.5 to 10 milliequivalents per gram of metal-containing polymeric material.

Embodiment 1C is a metal complex-containing polymeric material that includes a) a polymeric material and b) a metal complex incorporated into the polymeric material. The polymeric material contains i) 15 to 65 weight percent of a first monomeric unit that is of Formula (I),

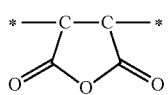

Formula (II),

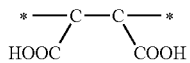

or a mixture thereof; ii) 30 to 85 weight percent of a second monomeric unit that is of Formula (III); and

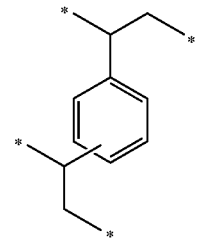

iii) 0 to 40 weight percent (or 5 to 40 weight percent) of a third monomeric unit that is of Formula (IV)

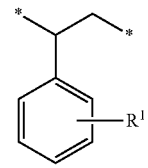

wherein $R^1$ is hydrogen or alkyl. The metal complex contains a reaction product of a divalent metal and at least one basic, nitrogen-containing compound.

Embodiment 2C is the metal complex-containing polymeric material of embodiment 1C, wherein metal complex-containing polymeric material further comprises divalent metal that is not in the form of the metal complex.

Embodiment 3C is the metal complex-containing polymeric material of embodiment 1C or 2C, wherein the total amount of divalent metal is in a range of 10 to 100 weight percent based on a total weight of the polymeric material (or in a range of 1.5 to 15 mmoles per gram of the polymeric material).

Embodiment 4C is the metal complex-containing polymeric material of any one of embodiments 1C to 3C, wherein the basic, nitrogen-containing compound has a molecular weight not greater than 150 grams/mole.

Embodiment 5C is the metal complex-containing polymeric material of any one of embodiments 1C to 4C, wherein the basic, nitrogen-containing compound is ammonia, a hydrazine compound, an amine compound, or a nitrogen-containing heterocyclic compound.

Embodiment 6C is the metal complex-containing polymeric material of any one of embodiments 1C to 5C, wherein the basic, nitrogen-containing compound of formula Q is ammonia, hydrazine, methylhydrazine, methylamine, dimethylamine, trimethylamine, ethylamine, diethylamine, trimethylamine, propylamine, dipropylamine, tripropylamine, isopropylamine, diisopropylamine, triisopropylamine, ethanolamne, cyclohexylamine, morpholine, pyridine, benzylamine, phenylhydrazine, ethylene diamine, 1,3-propane diamine, or a mixture thereof.

Embodiment 7C is the metal complex-containing polymeric material of any one of embodiments 1C to 6C, wherein the divalent metal is from a Group 2 or Group 6 to 12 metal of the IUPAC Periodic Table of Elements.

Embodiment 8C is the metal complex-containing polymeric material of any one of embodiments 1C to 7C, wherein the divalent metal is from a Group 6 to 12 metal of the IUPAC Periodic Table of Elements.

Embodiment 9C is the metal complex-containing polymeric material of any one of embodiments 1C to 8C, wherein the divalent metal is copper, cobalt, zinc, or nickel.

Embodiment 10C is the metal complex-containing polymeric material of any one of embodiments 1C to 9C, wherein the divalent metal is zinc or copper.

Embodiment 11C is the metal complex-containing polymeric material of any one of embodiments 1C to 10C, wherein the divalent metal is zinc.

Embodiment 12C is the metal complex-containing polymeric material of any one of embodiments 1C to 11C, wherein the polymeric material comprises i) 25 to 60 weight percent monomeric units of Formula (I), Formula (II), or a mixture thereof, ii) 30 to 75 weight percent monomeric units of Formula (III), and 1 to 30 weight percent (or 10 to 30 weight percent) monomeric units of Formula (IV).

Embodiment 13C is the metal complex-containing polymeric material of any one of embodiments 1C to 12C, wherein the polymeric material comprises i) 30 to 60 weight percent monomeric units of Formula (I), Formula (II), or a mixture thereof, ii) 30 to 65 weight percent monomeric units of Formula (III), and iii) 5 to 20 weight percent (or 10 to 20 weight percent) monomeric units of Formula (IV).

Embodiment 14C is the metal complex-containing polymeric material of any one of embodiments 1C to 13C, wherein the polymeric material comprises i) 40 to 60 weight percent monomeric units of Formula (I), Formula (II), or a mixture thereof, ii) 30 to 55 weight percent monomeric units of Formula (III), and 5 to 20 weight percent (or 10 to 20 weight percent) monomeric units of Formula (IV).

Embodiment 15C is the metal complex-containing polymeric material of any one of embodiments 1C to 14C, wherein the metal-containing polymeric material changes color upon exposing the metal-containing polymeric material to vapors of the basic, nitrogen-containing compound of formula Q.

Embodiment 16C is the metal complex-containing polymeric material of any one of embodiments 1C to 15C, wherein the metal-containing polymeric material sorbs an amount of the basic, nitrogen-containing compound of formula Q in a range of 0.5 to 10 milliequivalents per gram of metal-containing polymeric material.

Embodiment 1D is a method of preparing a metal-containing polymer. The method includes a) providing a polymeric material and b) sorbing a divalent metal on the polymeric material in an amount of at least 10 weight percent based on the weight of the polymeric material (or at least 1.5 mmoles per gram of the polymeric material). The polymeric material contains i) 15 to 65 weight percent of a first monomeric unit that is of Formula (I),

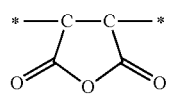

Formula (II),

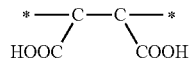

or a mixture thereof; ii) 30 to 85 weight percent of a second monomeric unit that is of Formula (III); and

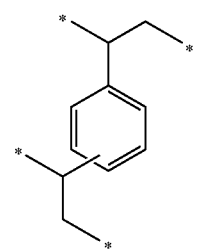

iii) 0 to 40 weight percent (or 5 to 40 weight percent) of a third monomeric unit that is of Formula (IV)

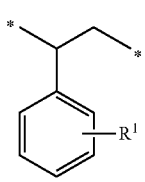

wherein $R^1$ is hydrogen or alkyl.

Embodiment 2D is the method of embodiment 1D, wherein the amount of the divalent metal is in a range of 10 to 100 weight percent based on the weight of the polymeric material (or in a range of 1.5 to 15 mmoles per gram of the polymeric material).

Embodiment 3D is the method of embodiment 1D or 2D, wherein the divalent metal is from a Group 2 or Group 6 to 12 metal of the IUPAC Periodic Table of Elements.

Embodiment 4D is the method of any one of embodiments 1D to 3D, wherein the divalent metal is a Group 6 to 12 metal of the IUPAC Periodic Table of Elements.

Embodiment 5D is the method of any one of embodiments 1D to 4D, wherein the divalent metal is copper, cobalt, zinc, or nickel.

Embodiment 6D is the method of any one of embodiments 1D to 5D, wherein the divalent metal is zinc or copper.

Embodiment 7D is the method of any one of embodiments 1D to 6D, wherein the divalent metal is zinc.

Embodiment 8D is the method of any one of embodiments 1D to 7D, wherein the polymeric material comprises i) 25 to 60 weight percent monomeric units of Formula (I), Formula (II), or a mixture thereof, ii) 30 to 75 weight percent monomeric units of Formula (III), and 1 to 30 weight percent (or 10 to 30 weight percent) monomeric units of Formula (IV).

Embodiment 9D is the method of any one of embodiments 1D to 8D, wherein the polymeric material comprises i) 30 to 60 weight percent monomeric units of Formula (I), Formula (II), or a mixture thereof, ii) 30 to 65 weight percent monomeric units of Formula (III), and iii) 5 to 20 weight percent (or 10 to 20 weight percent) monomeric units of Formula (IV).

Embodiment 10D is the method of any one of embodiments 1D to 9D, wherein the polymeric material comprises i) 40 to 60 weight percent monomeric units of Formula (I), Formula (II), or a mixture thereof, ii) 30 to 55 weight percent monomeric units of Formula (III), and 5 to 20 weight percent (or 10 to 20 weight percent) monomeric units of Formula (IV).

Embodiment 11D is the method of any one of embodiments 1D to 10D, wherein the metal-containing polymeric material has a BET specific surface area equal to at least 15 m$^2$/gram or at least 25 m$^2$/gram.

Embodiment 1E is a method for detecting the presence of water vapor. The method includes providing a metal-containing polymeric material as described above where the divalent metal is zinc (i.e., the metal-containing polymeric material is a zinc-containing polymeric material of Embodiment 7A) and then exposing the zinc-containing polymeric material to water vapor. The color of the zinc-containing polymeric material changes after exposing the zinc-containing polymeric material to water vapor.

Embodiment 2E is the method of embodiment 1E, wherein the zinc-containing polymeric material comprises 10 to 100 weight percent zinc based on the weight of the polymeric material (or in a range of 1.5 to 15 mmoles zinc per gram of the polymeric material).

Embodiment 3E is the method of embodiment 1E or 2E, wherein the polymeric material comprises i) 25 to 60 weight percent monomeric units of Formula (I), Formula (II), or a mixture thereof, ii) 30 to 75 weight percent monomeric units of Formula (III), and 1 to 30 weight percent (or 10 to 30 weight percent) monomeric units of Formula (IV).

Embodiment 4E is the method of any one of embodiments 1E to 3E, wherein the polymeric material comprises i) 30 to 60 weight percent monomeric units of Formula (I), Formula (II), or a mixture thereof, ii) 30 to 65 weight percent monomeric units of Formula (III), and iii) 5 to 20 weight percent (or 10 to 20 weight percent) monomeric units of Formula (IV).

Embodiment 5E is the method of any one of embodiments 1E to 4E, wherein the polymeric material comprises i) 40 to 60 weight percent monomeric units of Formula (I), Formula (II), or a mixture thereof, ii) 30 to 55 weight percent monomeric units of Formula (III), and 5 to 20 weight percent (or 10 to 20 weight percent) monomeric units of Formula (IV).

Embodiment 6E is the method of any one of embodiments 1E to 5E, wherein the metal-containing polymeric material has a BET specific surface area equal to at least 15 m$^2$/gram or at least 25 m$^2$/gram.

EXAMPLES

TABLE 1

List of materials

| Chemical Name | Chemical Supplier |
|---|---|
| Divinylbenzene (DVB) (80% technical grade), which contained 80 weight percent DVB and 20 weight percent styrene-type monomers. The calculation of moles of DVB used to prepare the polymeric material does take into account the purity. | Sigma-Aldrich, Milwaukee, WI |
| Maleic anhydride (MA) | Alfa Aesar, Ward Hill, MA |
| Benzoyl peroxide (BPO) | Sigma-Aldrich, Milwaukee, WI |
| Ethyl acetate (EtOAc) | EMD Millipore Chemicals, Billerica, MA |
| Sodium hydroxide (NaOH) | EMD Millipore Chemicals, Billerica, MA |
| Methanol (MeOH) | BDH Merck Ltd., Poole Dorset, UK |
| Concentrated hydrogen chloride (HCl) | EMD Millipore Chemicals, Billerica, MA |
| Zinc (II) chloride (ZnCl$_2$), anhydrous, 99.99% | Alfa Aesar, Ward Hill, MA |
| Nickel (II) chloride (NiCl$_2$), anhydrous, 98% | Alfa Aesar, Ward Hill, MA |
| Copper (II) chloride (CuCl$_2$), anhydrous, 98% | Alfa Aesar, Ward Hill, MA |
| Magnesium (II) chloride (MgCl$_2$), anhydrous, 99.99% | Alfa Aesar, Ward Hill, MA |
| Zinc (II) acetate (Zn(OAc)$_2$), anhydrous | Alfa Aesar, Ward Hill, MA |
| Copper (II) nitrate (Cu(NO$_3$)$_2$), anhydrous | Fischer Scientific, Fairlawn, NJ |
| Copper (II) sulfate (Cu(SO$_4$), anhydrous | Alfa Aesar, Ward Hill, MA |
| 1.0M Aqueous solution ammonium hydroxide (NH$_4$OH) | EMD Millipore Chemicals, Billerica, MA |
| 2,2'-Azobis(2,4-dimethylpentanenitrile) (VAZO 52) | E. I. du Pont de Nemours, Wilmington, DE |
| Bromoxylenol Blue | Sigma-Aldrich, Milwaukee, WI |
| Ammonium hydroxide (28-30 weight percent ammonia) | EM Science, Gibbstown, NJ |

Gas Sorption Analysis

Porosity and gas sorption experiments were performed using an Accelerated Surface Area and Porosimetry (ASAP) 2020 System from Micromeritics Instrument Corporation (Norcross, Ga.). The adsorbates were of ultra-high purity. The following is a typical method used for the characterization of the porosity within the exemplified materials. In a Micromeritics half inch diameter sample tube, 50-250 milligrams of material was degassed by heating under ultra-high vacuum (3-7 micrometers Hg) on the analysis port of the ASAP 2020 to remove residual solvent and other adsorbates. The degas procedure for the non-hydrolyzed copolymers was 2 hours at 150° C. The degas procedure for the hydrolyzed copolymers was 2 hours at 80° C. The degas procedure for the metal-containing copolymers was 3 hours at 150° C.

Argon sorption isotherms at 77° K for the non-hydrolyzed and hydrolyzed copolymers were obtained using low pressure dosing (5 cm$^3$/g) at a relative pressure)(p/p°) less than 0.1 and a pressure table of linearly spaced pressure points from a relative pressure)(p/p°) in a range from 0.1 to 0.98. Argon sorption isotherms at 77° K for the metal-containing copolymers were obtained using low pressure dosing (2 cm$^3$/g) at a relative pressure)(p/p°) less than 0.1 and a pressure table of linearly spaced pressure points from a relative pressure)(p/p°) in a range from 0.1 to 0.98. The method for all isotherms made use of the following equilibrium intervals: 90 seconds at relative pressure)(p/p°) less than $10^{-5}$, 40 seconds at relative pressure)(p/p°) in a range of $10^{-5}$ to 0.1, and 20 seconds at relative pressure)(p/p°) greater than 0.1. Helium was used for the free space determination, after argon sorption analysis, both at ambient temperature and at 77° K. BET specific surface areas ($SA_{BET}$) were calculated from argon adsorption data by multipoint Brunauer-Emmett-Teller (BET) analysis. Apparent micropore distributions were calculated from argon adsorption data by density functional theory (DFT) analysis using the argon at 77° K on carbon slit pores by non-linear density functional theory (NLDFT) model. Total pore volume was calculated from the total amount of argon adsorbed at a relative pressure)(p/p°) equal to approximately 0.98. BET, DFT and total pore volume analyses were performed using Micromeritics MicroActive Version 1.01 software.

Elemental Analysis

The samples were dried on steam plates for one hour before weighing. A sample (approximately 0.2-0.5 grams) was weighed to the nearest 0.1 milligram into acid-washed 1 by 12 inch quartz test tubes. Concentrated nitric acid (4 mL) was then added to each sample test tube and to two empty test tubes that were used as controls. The samples were pre-digested at room temperature for 15 minutes. All the vessels were then capped and placed in a Milestone UltraWave microwave system. The base vessel was filled with 150 mL $H_2O$ and 5 mL of concentrated nitric acid. The tubes were heated with a pre-defined program, with maximum temperature at 240° C. Once the samples had cooled, their contents were transferred to a centrifuge tube and diluted to 50 mL with 18-Me DI $H_2O$. The samples were diluted by an additional 1000 fold with DI water prior to ICP-AES analysis.

The instrument used for elemental analysis was a Perkin Elmer Optima 4300DV ICP optical emission spectrophotometer. The samples were analyzed against external calibration curves generated using acid-matched solution standards containing 0, 0.2, 0.5, and 1 ppm of each analyte. A 0.5 ppm quality control standard was used to monitor the accuracy of the calibration curve during the analysis. A 0.5 ppm solution of scandium was run in-line with the samples and standards to serve as an internal standard. The elements screened during this analysis were Zn, Cu, Ni and Mg.

Ammonia Capacity Test

A simple flow-through custom built delivery system was used to deliver known concentrations of ammonia to the sample for measurement. Stainless steel tubing was used throughout the delivery system. Ammonia was delivered to the system from a dry 1% (10,000 parts per million (ppm)) certified ammonia in nitrogen pressurized gas cylinder (Oxygen Service Company, St. Paul, Minn., USA). The ammonia/nitrogen stream was further diluted with additional nitrogen by use of a series of digital mass flow controllers (available under the designation DFC26 from Aalborg, Orangeburg, N.Y., USA) to deliver a 1000 ppm stream of ammonia at a flow of 50 mL/minute to the testing tube. The digital mass flow controllers were calibrated by placing a Gilibrator-2 Primary Airflow Calibrator (Sensidyne, St. Petersburg, Fla., USA) at the output of each controller. The Gilibrator flow meter was used to measure a range of flows from each flow controller that was used to generate calibration curves. Using these calibrations curves, the mass flow controllers were set to deliver the desired ammonia concentration at the desired gas flow rate.

The ammonia removal capacity for a test material was determined by adding sieved particles of a test material to a tared test tube until the bed depth in the tube was 0.5 centimeters (cm) after being tamped. The inner diameter of the test tube was 0.7 cm. The mass of the test material was then determined by weighing the test material in the test tube. The test tube was then connected in line with the system, allowing the 1000 ppm ammonia gas stream to flow through the test material. To the downstream side of the test tube, tubing was connected that led to a gas chromatograph instrument (SRI 8610C, SRI Instruments, Torrance, Calif., USA). At the time the ammonia gas stream began to pass through the test material, the test was considered started, and a timer was started. The SRI gas chromatograph then periodically sampled the gas stream and passed the sample of the gas stream through a 6'×⅛"×0.085" AT steel Alltech Chromosorb 103 80/100 column (Alltech Associates, Grace Davidson Discovery Sciences, Bannockburn, Ill., USA). The gas chromatograph instrument was equipped with a 10.6 eV lamp photoionization detector to detect ammonia in the effluent. Good ammonia vapor detection occurred when the gas chromatograph sampled the gas stream for 20 seconds, allowed the sample of the gas stream to pass through the column for 280 seconds, and then flushed out the sample of the gas stream for 60 seconds before it drew in the next sample of the gas stream to be analyzed.

Prior to testing, a certified 57 ppm ammonia in nitrogen pressurized gas cylinder (Oxygen Services Company, St. Paul, Minn., USA) was used to calibrate the gas chromatograph software. The signal generated by this effluent was used to set the software to 50 ppm ammonia. The end point of the ammonia vapor test was defined as the point corresponding to the time at which the ammonia effluent passing through the bed of test material produced a signal on the PID detector that exceeded the signal corresponding to 50 ppm. The performance of each test material was reported as the number of minutes until 50 ppm breakthrough was observed performing the test as described above. In addition, the area under the curve of the breakthrough plot until 50 ppm breakthrough coupled with the known mass of the test material used in this fixed volume test was used to calculate a mmol/g capacity for each test material using a sum of least squares equation.

Infrared Spectroscopy Analysis

The infrared spectrum of the zinc-containing polymeric material of Example 2 was acquired using an Agilent Technologies Cary 630 FTIR equipped with a diamond attenuated total reflectance (ATR) accessory. This accessory allowed for the acquisition of the infrared spectrum directly from the granules of the material thus avoiding further processing of the materials. A background spectrum was acquired prior to the acquisition of the spectrum of Example 2 and was subtracted from the spectrum of Example 2.

X-Ray Diffraction Analysis

Reflection geometry data was collected in the form of a survey scan by use of a Bruker D8 Advance diffractometer, copper $K_\alpha$, radiation, and Vantec detector registry of the scattered radiation. The diffractometer is fitted with variable incident beam slits and fixed diffracted beam slits. The survey scan was conducted in a coupled continuous mode from 5 to 80 degrees (2θ) using a 0.044 degree step size and 4 (2θ) second dwell time. X-ray generator settings of 40 kV and 40 mA were employed.

Comparative Examples 1-2 and Examples 1-3

In a 4 L jar, 80.3 grams (493 mmoles) DVB (80 weight percent purity, technical grade), 30.3 grams (309 mmoles) of MA and 2.25 grams (9.29 mmoles) of BPO were dissolved in 2153 grams of EtOAc. The polymerizable composition had 4.9 weight percent solids in EtOAc and contained a monomer mixture (58.1 weight percent DVB, 27.4 weight percent MA and 14.5 weight percent styrene-type monomers) and 2.0 weight percent BPO (based on total weight of monomers). The polymerizable composition was bubbled with nitrogen for 30 minutes. The jar was then capped and placed in a sand bath at 95° C. The polymerizable composition was heated at this elevated temperature for 18 hours. A white precipitate that formed was isolated by vacuum filtration and washed with EtOAc. The solid was divided up and placed in three 1 L jars and 700 mL of EtOAc was added to each jar. The solids were allowed to stand in EtOAc for one hour at room temperature. The solids from all three jars were again isolated by vacuum filtration in combination and washed with EtOAc. The solid was again divided up and placed in three 1 L jars and 700 mL of EtOAc was added to each jar. The solids were allowed to stand in EtOAc overnight. The solids were again isolated by vacuum filtration in combination and washed with EtOAc. The solid was then dried under high vacuum at 95° C. for eight hours. This non-hydrolyzed polymeric material had a $SA_{BET}$ of 637.6 m$^2$/g and a total pore volume of 0.637 cm$^3$/g (p/p°) equal to 0.971) as determined by argon adsorption.

The non-hydrolyzed polymeric material was treated with a hydrolyzing agent (sodium hydroxide (NaOH)). More specifically, 35.0 grams (875 mmoles) of NaOH was dissolved in 600 mL of MeOH within a 1 L jar. To this solution was added 5.01 grams of the above non-hydrolyzed polymeric material. The jar was then capped and placed in a sand bath at 80° C. This suspension was heated at this elevated temperature for 18 hours. The solid was isolated by vacuum filtration and washed with deionized water. The solid was placed in a 4 ounce jar, and 55 mL of 0.1 M aqueous hydrogen chloride (HCl) was added. The solid was allowed to stand in the aqueous HCl for 30 minutes. The solid was again isolated by vacuum filtration and washed with deionized water. The solid was then dried under high vacuum at 95° C. for eight hours. This hydrolyzed polymeric material had a $SA_{BET}$ of 503.7 m$^2$/g and a total pore volume of 0.628 cm$^3$/g (p/p°) equal to 0.952) as determined by argon adsorption.

The five metal-containing polymeric materials of Comparative Examples 1-2 and Examples 1-3 were prepared using aqueous zinc (II) chloride (ZnCl$_2$) solutions of 0.5, 1.0, 3.0, 6.0, and 10.0 M, respectively. The following procedure was used to prepare Comparative Examples 1-2 and Examples 1-3. In five separate flasks, 6.09 grams of ZnCl$_2$ was dissolved in the appropriate amount of water to make 0.5, 1.0, 3.0, 6.0 and 10.0 M aqueous solutions of ZnCl$_2$. To each solution was added 0.5 grams of the hydrolyzed polymeric material described above. Each vial was then capped and placed on a wrist shaker. Each suspension was shaken for 18 hours at room temperature. The solid from each vial was isolated by vacuum filtration without using additional deionized water to transfer or wash the zinc-containing polymeric material. The solid was then dried under high vacuum at 95° C. for eight hours. The ZnCl$_2$ solution concentration used to prepare each sample, $SA_{BET}$, total pore volume, weight percent of zinc as determined by elemental analysis, mmoles of zinc per gram as determined by elemental analysis and color of each zinc-containing polymeric material are shown in Table 2.

The zinc-containing polymeric material of Example 2 was further characterized by infrared spectroscopy and X-ray diffraction. The infrared spectrum of the hydrolyzed polymeric material used to prepare the zinc-containing polymeric material of Example 2 had a large peak at 1735 cm$^{-1}$ consistent with v (C=O) of carboxylic acid groups. The infrared spectrum of the zinc-containing polymeric material of Example 2 showed only a very small peak at 1735 cm$^{-1}$ and two new broad peaks at 1584 cm$^{-1}$ and 1434 cm$^{-1}$. These two new peaks were consistent with $v_{as}$ (COO$^-$) and $v_s$ (COO$^-$), respectively, of zinc (II) carboxylate groups in various binding modes.

Analysis of the zinc-containing polymeric material of Example 2 by X-ray diffraction analysis showed no crystalline structures within the material. The results of this analysis were consistent with the zinc being present within the zinc-containing polymeric material of Example 2 in an amorphous form. Limitations of this analysis however cannot rule out some or all of the zinc being present in the form of nanocrystals with diameters of less than 1 nm.

TABLE 2

Characterization of zinc-containing polymeric materials (hydrolyzed) of Comparative Examples 1-2 and Examples 1-3

| Example | ZnCl$_2$ Concentration used to Prepare | $SA_{BET}$ (m$^2$/g) | Total Pore Volume (cm$^3$/g) (p/p°) | Wt. % Zn | mmoles Zn per gram | Color |
|---|---|---|---|---|---|---|
| Comparative Example 1 | 0.5 | 471.1 | 0.441 (0.977) | 4.3 | 0.66 | White |
| Comparative Example 2 | 1.0 | 413.6 | 0.391 (0.977) | 6.5 | 0.99 | White |
| Example 1 | 3.0 | NA* | NA* | 18.8 | 2.88 | Pink |
| Example 2 | 6.0 | 241.9 | 0.285 (0.976) | 17.1 | 2.62 | Pink/purple |
| Example 3 | 10.0 | 154.4 | 0.191 (0.976) | 22.8 | 3.49 | Dark purple |

*NA means Not Analyzed. The surface area and total pore volume of Example 1 was not measured; however, Example 4 was a repeat of Example 1 and was found to have a $SA_{BET}$ of 197.5 m$^2$/g and a total pore volume of 0.243 cm$^3$/g (p/p° equal to 0.977).

The zinc-containing polymeric materials of Comparative Examples 1-2 and Examples 1-3 were each individually sieved to 40×80 mesh size (e.g., the material passed through a 40 mesh screen but was retained by a 80 mesh screen). This sieved material was used to perform the ammonia vapor test, as described above, to determine the ammonia capacity of each zinc-containing polymeric material. The numbers of minutes each test lasted, the calculated mmol/gram capacity and the final color of each zinc-containing polymeric material at the end of the test are shown in Table 3.

TABLE 3

Adsorption of ammonia by Comparative Examples 1-2 and Examples 1-3

| Example | Test Material Mass | Minutes Until 50 ppm Breakthrough | Capacity (mmoles/g) | Color at Test Completion |
|---|---|---|---|---|
| Comparative Example 1 | 0.0647 | 39 | 1.33 | White |
| Comparative Example 2 | 0.0708 | 50.5 | 1.38 | White |
| Example 1 | 0.0590 | 87.5 | 2.97 | White |
| Example 2 | 0.0665 | 78 | 2.38 | Tan |
| Example 3 | 0.0992 | 101 | 1.99 | Tan |

Examples 4-6

In a 1 L jar, 26.3 grams (162 mmoles) DVB (80 weight percent purity, technical grade), 10.1 grams (103 mmoles) of MA and 0.750 grams (3.10 mmoles) of BPO were dissolved in 717.6 grams of EtOAc. The polymerizable composition had 4.8 weight percent solids in EtOAc and contained a monomer mixture (57.8 weight percent DVB, 27.7 weight percent MA and 14.5 weight percent styrene-type monomers) and 2.1 weight percent BPO (based on total weight of monomers). The polymerizable composition was bubbled with nitrogen for 20 minutes. The jar was then capped and placed in a sand bath at 95° C. The polymerizable composition was heated at this elevated temperature for 17 hours. A white precipitate that formed was isolated by vacuum filtration and washed with EtOAc. The solid was placed in a 1 L jar and 500 mL of EtOAc was added to the jar. The solid was allowed to stand in EtOAc for one hour at room temperature. The solid was again isolated by vacuum filtration and washed with EtOAc. The solid was placed in a 1 L jar and 500 mL of EtOAc was added to the jar. The solid was allowed to stand in EtOAc overnight. The solid was again isolated by vacuum filtration and washed with EtOAc. The solid was then dried under high vacuum at 95° C. for eight hours. This non-hydrolyzed polymeric material had a $SA_{BET}$ of 695.2 m$^2$/g and a total pore volume of 0.746 cm$^3$/g (p/p°) equal to 0.951) as determined by argon adsorption.

The non-hydrolyzed polymeric material was treated with a hydrolyzing agent (NaOH). More specifically, 13.4 grams (336 mmoles) of NaOH was dissolved in 112 mL of deionized water within an 8 ounce jar. To this solution was added 6.02 grams of the above non-hydrolyzed polymeric material. The jar was then capped and placed in a sand bath at 80° C. This suspension was heated at this elevated temperature for 18 hours. The solid was isolated by vacuum filtration and washed with deionized water. The solid was placed in a 4 ounce jar, and 55 mL of 0.1 M aqueous HCl was added. The solid was allowed to stand in the aqueous HCl for one hour. The solid was again isolated by vacuum filtration and washed with deionized water. The solid was then dried under high vacuum at 80° C. for eight hours. This hydrolyzed polymeric material had a $SA_{BET}$ of 386.5 m$^2$/g and a total pore volume of 0.396 cm$^3$/g (p/p°) equal to 0.976) as determined by argon adsorption.

The three metal-containing polymeric materials of Examples 4-6 were prepared using aqueous solution of ZnCl$_2$, nickel (II) chloride (NiCl$_2$) and copper (II) chloride (CuCl$_2$), respectively. The following procedure was used to prepare Examples 4-6. In three 40 mL vials, 30 mL of an aqueous 3.0 M solution of ZnCl$_2$, NiCl$_2$ or CuCl$_2$ was prepared by dissolving the appropriate amount of ZnCl$_2$, NiCl$_2$ or CuCl$_2$ in 30 mL of deionized water. To each solution was added 1.0 gram of the hydrolyzed polymeric material described above. Each vial was then capped and placed on a wrist shaker. Each suspension was shaken for 18 hours at room temperature. The solid was isolated by vacuum filtration without using additional deionized water to transfer or wash the material. The solid was then dried under high vacuum at 95° C. for eight hours. The metal chloride solution used to prepare each sample, $SA_{BET}$, total pore volume, weight percent of metal as determined by elemental analysis, mmoles of metal gram as determined by elemental analysis and color of each metal-containing polymeric material are shown in Table 4.

TABLE 4

Characterization of metal-containing polymeric materials (hydrolyzed) of Examples 4-6

| Example | Metal Chloride Used To Prepare | $SA_{BET}$ (m$^2$/g) | Total Pore Volume (cm$^3$/g) (p/p°) | Wt. % Metal | mmoles Metal per gram | Color |
|---|---|---|---|---|---|---|
| Example 4 | ZnCl$_2$ | 197.5 | 0.243 (0.977) | 20.2 | 3.09 | Purple |
| Example 5 | NiCl$_2$ | 128.3 | 0.151 (0.974) | 21.6 | 3.68 | Tan |
| Example 6 | CuCl$_2$ | 337.3 | 0.320 (0.976) | 15.6 | 2.45 | Dark gray/green |

The metal-containing polymeric materials of Examples 4-6 were each individually sieved to 40×80 mesh size, and this material was used to perform the ammonia vapor test, as described above, to determine the ammonia capacity of each metal-containing polymeric material. The numbers of minutes each test lasted, the calculated mmoles/gram capacity and the final color of each metal-containing polymeric material at the end of the test are shown in Table 5.

TABLE 5

Adsorption of ammonia by Examples 4-6

| Example | Test Material Mass (grams) | Minutes Until 50 ppm Breakthrough | Capacity (mmoles/g) | Color at Test Completion |
|---|---|---|---|---|
| Example 4 | 0.0927 | 186 | 4.00 | Tan |
| Example 5 | 0.0815 | 141 | 3.45 | Olive green |
| Example 6 | 0.0655 | 93 | 2.81 | Turquoise |

Examples 7-10

A series of four non-hydrolyzed polymeric materials were prepared using different ratios of the monomers DVB (80 weight percent purity, technical grade) and MA. The polymerizable composition used to make each non-hydrolyzed polymeric material had 50 weight percent solids in EtOAc and 2.0 weight percent BPO (based on total weight of monomers). The monomer composition by weight is shown for each non-hydrolyzed polymeric material in Table 6. The following procedure was used to prepare these four non-hydrolyzed polymeric materials. Each polymerizable composition was bubbled with nitrogen for 30 minutes. Each jar was then capped and placed in a sand bath at 95° C. The polymerizable composition was heated at this elevated temperature for 18 hours. A white precipitate that formed in each jar was isolated by vacuum filtration and washed with EtOAc. Each solid was placed in a jar and covered with EtOAc. The solids were allowed to stand in EtOAc for one hour at room temperature. Each solid was again isolated by vacuum filtration and washed with EtOAc. Each solid was again placed in a container and covered with EtOAc. The solids were allowed to stand in EtOAc overnight. Each solid was again isolated by vacuum filtration and washed with EtOAc. Each solid was then dried under high vacuum at 95° C. for eight hours. The $SA_{BET}$ and total pore volume for each non-hydrolyzed polymeric material as determined by argon adsorption is shown in Table 6. The non-hydrolyzed polymeric materials are referred to as Preparatory Examples 7-1 to 10-1 (PE 7-1 to PE 10-1).

TABLE 6

Composition and characterization of non-hydrolyzed polymeric material PE 7-1 to PE 10-1

| Preparatory Example | Wt. % DVB | Wt. % MA | Wt. % St | $SA_{BET}$ $(m^2/g)$ | Total Pore Volume $(cm^3/g)$ (p/p°) |
|---|---|---|---|---|---|
| PE 7-1 | 45.6 | 43.0 | 11.4 | 290.6 | 0.241 (0.977) |
| PE 8-1 | 41.2 | 48.5 | 10.3 | 249.4 | 0.219 (0.978) |
| PE 9-1 | 37.6 | 53.0 | 9.4 | 206.5 | 0.201 (0.978) |
| PE 10-1 | 31.9 | 60.1 | 8.0 | 240.4 | 0.275 (0.959) |

The non-hydrolyzed polymeric materials PE 7-1 to PE 10-1 were treated with a hydrolyzing agent (NaOH). More specifically, in separate 4 ounce jars for each non-hydrolyzed polymeric material, 35 mL of 3.0 M aqueous NaOH was prepared by dissolving 4.20 grams (105 mmoles) of NaOH in 35 mL of deionized water. To each solution was added 1.00 gram of one of the non-hydrolyzed polymeric materials. Each jar was then capped and placed in a sand bath at 80° C. Each suspension was heated at this elevated temperature for 18 hours. The solid content from each jar was isolated by vacuum filtration and washed with deionized water. Each solid was placed in a 4 ounce jar, and 100 mL of 1.0 M aqueous hydrogen chloride (HCl) was added. Each solid was allowed to stand in the aqueous HCl for 30 minutes. Each solid was again isolated by vacuum filtration and washed with deionized water. Each solid was then dried under high vacuum at 95° C. for eight hours. The $SA_{BET}$ and total pore volume for each hydrolyzed polymeric material as determined by argon adsorption are shown in Table 7. The hydrolyzed polymeric materials are referred to as Preparatory Examples 7-2 to 10-2 (PE 7-2 to PE 10-2).

TABLE 7

Characterization of hydrolyzed polymeric materials PE 7-2 to PE 10-2

| Preparatory Example | $SA_{BET}$ $(m^2/g)$ | Total Pore Volume $(cm^3/g)$ (p/p°) |
|---|---|---|
| PE 7-2 | 109.0 | 0.135 (0.979) |
| PE 8-2 | 92.2 | 0.114 (0.978) |
| PE 9-2 | 90.5 | 0.112 (0.976) |
| PE 10-2 | 111.5 | 0.137 (0.978) |

The four zinc-containing polymeric materials of Examples 7-10 were prepared using aqueous 6.0 M solutions of $ZnCl_2$. More specifically 0.7 grams of each hydrolyzed polymeric material PE 7-2 to PE 10-2 was placed in a 40 mL vial and 6.0 M aqueous $ZnCl_2$ was added such that there was a 32:1 molar ratio of $ZnCl_2$ to the maleic anhydride groups in the non-hydrolyzed polymeric material. Thus, the zinc-containing polymeric materials of Examples 7-10 were prepared using 16, 18, 20 and 23 mL, respectively, of 6.0 M aqueous $ZnCl_2$. Each vial was then capped and put on a wrist shaker. Each suspension was shaken for 18 hours at room temperature. The solid from each vial was isolated by vacuum filtration without using any additional deionized water to transfer or wash the material. Each solid was then dried under high vacuum at 95° C. for eight hours. The $SA_{BET}$, total pore volume, weight percent zinc as determined by elemental analysis, mmoles of zinc per gram as determined by elemental analysis and color of each zinc-containing polymeric material are shown in Table 8.

TABLE 8

Characterization of zinc-containing polymeric materials of Examples 7-10

| Example | $SA_{BET}$ $(m^2/g)$ | Total Pore Volume $(cm^3/g)$ (p/p°) | Wt. % Zn | mmoles Zn per gram | Color |
|---|---|---|---|---|---|
| Example 7 | 36.7 | 0.048 (0.979) | 24.4 | 3.73 | Light pink |
| Example 8 | 39.1 | 0.052 (0.979) | 27.0 | 4.13 | Light pink |
| Example 9 | 38.0 | 0.052 (0.979) | 26.7 | 4.08 | Light pink |
| Example 10 | 36.6 | 0.051 (0.978) | 29.8 | 4.56 | Light pink |

The zinc-containing polymeric materials of Examples 7-10 were each individually sieved to 40×80 mesh size, and this material was used to perform the ammonia vapor test, as described above, to determine the ammonia capacity of each zinc-containing polymeric material. The numbers of minutes each test lasted, the calculated mmoles/gram capacity and the final color of each zinc-containing polymeric material at the end of the test are shown in Table 9.

TABLE 9

Adsorption of ammonia by Examples 7-10

| Example | Test Material Mass | Minutes Until 50 ppm Breakthrough | Capacity (mmoles/g) | Color at Test Completion |
|---|---|---|---|---|
| Example 7 | 0.0831 | 240 | 6.09 | White |
| Example 8 | 0.0903 | 306 | 6.69 | White |
| Example 9 | 0.0868 | 304 | 7.00 | White |
| Example 10 | 0.0967 | 346 | 7.07 | White |

Examples 11-15

A series of five non-hydrolyzed polymeric materials were prepared using different ratios of the monomers DVB (80 weight percent purity, technical grade) and MA and performing the polymerization at different percent solids. The non-hydrolyzed polymeric material of Example 11 was prepared using a procedure identical to that used to prepare the non-hydrolyzed polymeric material of Comparative Examples 1-2 and Examples 1-3. The non-hydrolyzed polymeric material of Example 13 was prepared using a procedure identical to that used to prepare the non-hydrolyzed polymeric material of Example 7. The non-hydrolyzed polymeric material of Example 14 was prepared using a procedure identical to that used to prepare the non-hydrolyzed polymeric material of Example 9. The non-hydrolyzed polymeric material of Example 15 was prepared using a procedure identical to that used to prepare the non-hydrolyzed polymeric material of Example 10.

The non-hydrolyzed polymeric material of Example 12 was prepared using the following procedure. In a 4 ounce jar, 2.14 grams (13.2 mmoles) DVB (80 weight percent purity, technical grade), 1.61 grams (16.4 mmoles) of MA, and 75.3 milligrams (311 mmoles) of BPO were dissolved in 71.25 grams of EtOAc. The polymerizable composition had 5.0 weight percent solids in EtOAc and contained a monomer mixture (45.6 weight percent DVB, 43.0 weight percent MA, and 11.4 weight percent styrene-type monomers) and 2.0 weight percent BPO (based on total weight of monomers). The polymerizable composition was bubbled with nitrogen for 10 minutes. The jar was then capped and placed in a sand bath at 95° C. The polymerizable composition was heated at this elevated temperature for 18 hours. A white precipitate that formed was isolated by vacuum filtration and was washed with EtOAc. The solid was placed in a jar and covered with EtOAc. The solid was allowed to stand in EtOAc for one hour at room temperature. The solid was again isolated by vacuum filtration and washed with EtOAc. The solid was again placed in a container and covered with EtOAc. The solid was allowed to stand in EtOAc overnight. The solid was again isolated by vacuum filtration and washed with EtOAc. The solid was then dried under high vacuum at 80° C. for 18 hours.

The $SA_{BET}$ and total pore volume for each of these five non-hydrolyzed polymeric materials as determined by argon adsorption are shown in Table 10. These non-hydrolyzed polymeric materials are referred to as Preparatory Examples 11-1 to 15-1 (PE 11-1 to PE 15-1).

TABLE 10

Composition and characterization of non-hydrolyzed polymeric material PE 11-1 to PE 15-1

| Preparatory Example | % Solids | Wt. % DVB | Wt. % MA | Wt. % St | $SA_{BET}(m^2/g)$ | Total Pore Volume $(cm^3/g)$ $(p/p°)$ |
|---|---|---|---|---|---|---|
| PE 11-1 | 5 | 58.1 | 27.4 | 14.5 | 637.6 | 0.637 (0.971) |
| PE 12-1 | 5 | 45.6 | 43.0 | 11.4 | 518.6 | 0.495 (0.977) |
| PE 13-1 | 50 | 45.6 | 43.0 | 11.4 | 290.6 | 0.241 (0.977) |
| PE 14-1 | 50 | 37.6 | 53.0 | 9.4 | 206.5 | 0.201 (0.978) |
| PE 15-1 | 50 | 31.9 | 60.1 | 8.0 | 240.4 | 0.275 (0.959) |

The five metal-containing polymeric materials of Examples 11-15 were prepared using aqueous 6.0 M solutions of $ZnCl_2$. More specifically 1.0 gram of each of the non-hydrolyzed polymeric materials PE 11-1 to 15-1 was placed in separate 40 mL vials and 6.0 M aqueous $ZnCl_2$ was added to each vial such that there was a 32:1 molar ratio of $ZnCl_2$ to the maleic anhydride groups in the non-hydrolyzed polymeric material. Thus, the zinc-containing polymeric materials of Examples 11-15 were prepared using 15, 23, 23, 29 and 33 mL, respectively, of 6.0 M aqueous $ZnCl_2$. Each vial was then capped and put on a wrist shaker. Each suspension was shaken for 18 hours at room temperature. Each solid was isolated by vacuum filtration without using any additional deionized water to transfer or wash the material. Each solid was then dried under high vacuum at 95° C. for eight hours. The $SA_{BET}$, total pore volume, weight percent of zinc as determined by elemental analysis, mmoles of zinc per gram as determined by elemental analysis and color of each zinc-containing polymeric material are shown in Table 11.

TABLE 11

Characterization of zinc-containing polymeric materials of Examples 11-15

| Example | $SA_{BET}$ $(m^2/g)$ | Total Pore Volume $(cm^3/g)$ $(p/p°)$ | Wt. % Zn | mmoles Zn per gram | Color |
|---|---|---|---|---|---|
| Example 11 | 98.6 | 0.121 (0.978) | 24.7 | 3.78 | Pinkish purple |
| Example 12 | 21.6 | 0.037 (0.980) | 24.1 | 3.69 | Light pink |
| Example 13 | 73.9 | 0.081 (0.980) | 20.6 | 3.15 | Light pink |
| Example 14 | 27.4 | 0.034 (0.980) | 24.7 | 3.78 | Light pink |
| Example 15 | 36.7 | 0.051 (0.979) | 26.9 | 4.11 | Light pink |

The zinc-containing polymeric materials of Examples 11-15 were each individually sieved to 40×80 mesh size, and this material was used to perform the ammonia vapor test, as described above, to determine the ammonia capacity of each zinc-containing polymeric material. The numbers of minutes each test lasted, the calculated mmoles/gram capacity and the final color of each zinc-containing polymeric material at the end of the test are shown in Table 12.

TABLE 12

Adsorption of ammonia by Examples 11-15

| Example | Test Material Mass | Minutes Until 50 ppm Breakthrough | Capacity (mmoles/g) | Color at Test Completion |
|---|---|---|---|---|
| Example 11 | 0.0776 | 148 | 3.87 | Tan |
| Example 12 | 0.1380 | 60 | 2.00 | White |
| Example 13 | 0.0914 | 70 | 1.42 | White |
| Example 14 | 0.0958 | 246 | 5.14 | White |
| Example 15 | 0.0985 | 331 | 6.68 | White |

Examples 16-18

In a 4 ounce jar, 7.98 grams (49.0 mmoles) DVB (80 weight percent purity, technical grade), 12.0 grams (122 mmol) of MA and 407 milligrams (1.68 mmoles) of BPO were dissolved in 20.2 grams of EtOAc. The polymerizable composition had 49.7 weight percent solids in EtOAc and contained a monomer mixture (31.9 weight percent DVB, 60.1 weight percent MA and 8.0 weight percent styrene-type monomers) and 2.0 weight percent BPO (based on total weight of monomers). The polymerization composition was bubbled with nitrogen for 10 minutes. The jar was then capped and placed in a sand bath at 95° C. The polymerization composition was heated for 17 hours at this elevated temperature. A white precipitate that had formed was isolated by vacuum filtration and washed with EtOAc. The solid was placed in a 4 ounce jar and 100 mL of EtOAc was added to the jar. The solid was allowed to stand in EtOAc for one hour at room temperature. The solid was again isolated by vacuum filtration and washed with EtOAc. The solid was placed in a 4 ounce jar and 100 mL of EtOAc was added to the jar. The solid was allowed to stand in EtOAc overnight. The solid was again isolated by vacuum filtration and washed with EtOAc. The solid was then dried under high vacuum at 95° C. for eight hours. This non-hydrolyzed polymeric material had a surface area ($SA_{BET}$) of 216.1 $m^2/g$ and a total pore volume of 0.220 cm³/g (p/p°) equal to 0.979) as determined by argon adsorption.

The metal-containing polymeric materials of Examples 16-18 were prepared using an aqueous solution of NiCl$_2$, CuCl$_2$ and MgCl$_2$, respectively. The following procedure was used to prepare Examples 16-18. In a 40 mL vial, 18 mL of an aqueous 3.0 M solution of either NiCl$_2$, CuCl$_2$ or MgCl$_2$ was prepared by dissolving the appropriate amount of NiCl$_2$, CuCl$_2$ or MgCl$_2$ in 18 mL of deionized water. To each solution was added 275 milligrams of the non-hydrolyzed polymeric material described above. The vial was then capped and put on a wrist shaker. This suspension was shaken for 18 hours at room temperature. The solid was isolated by vacuum filtration without using additional deionized water to transfer or wash the material. The solid was then dried under high vacuum at 95° C. for eight hours.

The metal chloride solution used to prepare, SA$_{BET}$, total pore volume, weight percent of metal as determined by elemental analysis, mmoles of metal per gram as determined by elemental analysis and color of each metal-containing polymeric material are shown in Table 13.

TABLE 13

Characterization of metal-containing polymeric materials of Examples 16-18

| Example | Metal Chloride used to Prepare | SA$_{BET}$ (m²/g) | Total Pore Volume (cm³/g) (p/p°) | Wt. % Metal | mmoles Metal per gram | Color |
|---|---|---|---|---|---|---|
| Example 16 | NiCl$_2$ | 62.1 | 0.051 (0.980) | 18.8 | 3.20 | Tan |
| Example 17 | CuCl$_2$ | 96.7 | 0.130 (0.978) | 16.4 | 2.58 | Dark brown/gray |
| Example 18 | MgCl$_2$ | 92.0 | 0.107 (0.977) | 6.4 | 2.63 | White |

The metal-containing polymeric materials of Examples 16-18 were each individually sieved to 40×80 mesh size, and this material was used to perform the ammonia vapor test, as described above, to determine the ammonia capacity of each metal-containing polymeric material. The number of minutes each test lasted, the calculated mmoles/gram capacity and the final color of each metal-containing polymeric material at the end of the test are shown in Table 14.

TABLE 14

Adsorption of ammonia by Examples 16-18

| Example | Test Material Mass | Minutes until 50 ppm Breakthrough | Capacity (mmoles/g) | Color at Test Completion |
|---|---|---|---|---|
| Example 16 | 0.1006 | 82 | 1.61 | Olive green |
| Example 17 | 0.0808 | 172 | 4.25 | Turquoise |
| Example 18 | 0.0843 | 92 | 2.09 | White |

Examples 19-24

In a 4 ounce jar, 7.98 grams (49.0 mmoles) DVB (80 weight percent purity, technical grade), 12.0 grams (122 mmoles) of MA and 407 milligrams (1.68 mmoles) of BPO were dissolved in 20.2 grams of EtOAc. The polymerizable composition had 49.7 weight percent solids in EtOAc and contained a monomer mixture (31.9 weight percent DVB, 60.1 weight percent MA and 8.0 weight percent styrene-type monomers) and 2.0 weight percent BPO (based on total weight of monomers). The polymerization composition was bubbled with nitrogen for 10 minutes. The jar was then capped and placed in a sand bath at 95° C. The polymerization composition was heated for 17 hours at this elevated temperature. A white precipitate that had formed was isolated by vacuum filtration and washed with EtOAc. The solid was placed in a 4 ounce jar and 100 mL of EtOAc was added to the jar. The solid was allowed to stand in EtOAc for one hour at room temperature. The solid was again isolated by vacuum filtration and washed with EtOAc. The solid was placed in a 4 ounce jar and 100 mL of EtOAc was added to the jar. The solid was allowed to stand in EtOAc overnight. The solid was again isolated by vacuum filtration and washed with EtOAc. The solid was then dried under high vacuum at 95° C. for eight hours. This non-hydrolyzed polymeric material had a surface area (SA$_{BET}$) of 216.1 m²/g and a total pore volume of 0.220 cm³/g (p/p°) equal to 0.979) as determined by argon adsorption.

The precursor polymeric material was treated with a hydrolyzing agent (NaOH). More specifically, 12.2 grams (306 mmoles) of NaOH was dissolved in 102 mL of deionized water within an 8 ounce jar. To this solution was added 5.00 grams of the above non-hydrolyzed polymeric material. The jar was then capped and placed in a sand bath at 80° C. This suspension was heated at this elevated temperature for 18 hours. The solid was isolated by vacuum filtration and washed with deionized water. The solid was placed in an 8 ounce jar, and 200 mL of 1.0 M aqueous HCl was added. The solid was allowed to stand in the aqueous HCl for 30 minutes. The solid was again isolated by vacuum filtration and washed with deionized water. The solid was then dried under high vacuum at 95° C. for eight hours. This hydrolyzed polymeric precursor material had a SA$_{BET}$ of 92.6 m²/g and a total pore volume of 0.118 cm³/g (p/p°) equal to 0.979) as determined by argon adsorption.

The metal-containing polymeric materials of Examples 19-21 were prepared using an aqueous solution of NiCl$_2$, CuCl$_2$ and MgCl$_2$, respectively. The following procedure was used to prepare Examples 19-21. In a 40 mL vial, 18 mL of an aqueous 3.0 M solution of either NiCl$_2$, CuCl$_2$ or MgCl$_2$ was prepared by dissolving the appropriate amount of NiCl$_2$, CuCl$_2$, or MgCl$_2$ in 18 mL of deionized water. To each solution was added 275 milligrams of the hydrolyzed polymeric material described above. The vial was then capped and put on a wrist shaker. This suspension was shaken for 18 hours at room temperature. The solid was isolated by vacuum filtration without using additional deionized water to transfer or wash the material. The solid was then dried under high vacuum at 95° C. for eight hours. The metal salt solution used to prepare, SA$_{BET}$, total pore volume, weight percent of metal as determined by elemental analysis, mmoles of metal per gram as determined by elemental analysis and color of each metal-containing polymeric material are shown in Table 15.

The metal-containing polymeric material of Example 22 was prepared using an aqueous solution of zinc (II) acetate (Zn(OAc)$_2$). More specifically, an aqueous Zn(OAc)$_2$ solution was prepared by dissolving 618 milliligrams (3.37 mmoles) of Zn(OAc)$_2$ in 5.0 mL of deionized water within a 20 mL vial. To this solution was added 300 milligrams of the hydrolyzed polymeric material described above. The vial was then capped and the solid was allowed to stand in the aqueous Zn(OAc)$_2$ solution at room temperature for 16 hours. The solid was isolated by vacuum filtration without using additional deionized water to transfer or wash the material. The solid was then dried in an oven at 120° C. for two hours. The metal salt solution used to prepare, $SA_{BET}$, total pore volume, weight percent of metal as determined by elemental analysis, mmoles of metal per gram as determined by elemental analysis and color of this metal-containing polymeric material are shown in Table 15.

The metal-containing polymeric material of Example 23 was prepared using an aqueous solution of copper (II) nitrate ($Cu(NO_3)_2$). More specifically, an aqueous $Cu(NO_3)_2$ solution was prepared by dissolving 618 milligrams (3.30 mmoles) of $Cu(NO_3)_2$ in 5.0 mL of deionized water within a 20 mL vial. To this solution was added 300 milligrams of the hydrolyzed polymeric material described above. The vial was then capped and the solid was allowed to stand in the aqueous $Cu(NO_3)_2$ solution at room temperature for 16 hours. A 1.0 M aqueous NaOH solution was then added dropwise until a color shift from light blue to darker blue/gray was observed. The solid was isolated by vacuum filtration without using additional deionized water to transfer or wash the material. The solid was then dried in an oven at 120° C. for two hours. The metal salt solution used to prepare, $SA_{BET}$, total pore volume, weight percent of metal as determined by elemental analysis, mmoles of metal per gram as determined by elemental analysis and color of this metal-containing polymeric material are shown in Table 15.

The metal-containing polymeric material of Example 24 was prepared using an ammoniacal solution of copper (II) sulfate ($CuSO_4$). More specifically, a 1 M ammoniacal solution of copper was prepared by dissolving 799 milligrams (5.00 mmoles) of $CuSO_4$ in 5.0 mL of deionized water within a 20 mL vial. A 1 M ammonium hydroxide solution was added dropwise until complete dissolution occurred. To this solution was added 300 milligrams of the hydrolyzed polymeric material described above. The vial was then capped and the solid was allowed to stand in the ammoniacal copper solution at room temperature for 16 hours. The solid was isolated by vacuum filtration without using additional deionized water to transfer or wash the material. The solid was then dried in an oven at 120° C. for two hours. The metal salt solution used to prepare, $SA_{BET}$, total pore volume, weight percent of metal as determined by elemental analysis, mmoles of metal per gram as determined by elemental analysis and color of this metal-containing polymeric material are shown in Table 15.

TABLE 16

Adsorption of ammonia by Examples 19-24

| Example | Test Material Mass | Minutes Until 50 ppm Breakthrough | Capacity (mmoles/g) | Color at Test Completion |
|---|---|---|---|---|
| Example 19 | 0.1183 | 51 | 0.88 | Olive green |
| Example 20 | 0.0813 | 175 | 4.19 | Turquoise |
| Example 21 | 0.0791 | 125 | 3.04 | White |
| Example 22 | 0.0727 | 139 | 3.79 | White |
| Example 23 | 0.0685 | 135 | 3.92 | Turquoise |
| Example 24 | 0.0754 | 61 | 1.62 | Light blue |

Comparative Example 3

A zinc-impregnated activated carbon was prepared by impregnating activated carbon with $ZnCl_2$. More specifically in an 8 ounce jar, 48.0 grams (352 mmoles) of $ZnCl_2$ was dissolved in 100 mL of deionized water. To this solution was added 25.0 grams of 40×140 mesh GC carbon (Kuraray Co., Tokyo, Japan). The jar was capped and put on a jar roller. This suspension was continuously rolled for one hour at room temperature. The solid was isolated by vacuum filtration without using additional distilled water to transfer or wash the material. The solid was then dried in a batch oven at 100° C. for 16 hours. The $SA_{BET}$, total pore volume, weight percent of zinc as determined by elemental analysis, mmoles of zinc per gram as determined by elemental analysis and color of this zinc-impregnated activated carbon are shown in Table 17.

TABLE 17

Characterization of zinc-containing activated carbon Comparative Example 3

| Example | $SA_{BET}$ (m²/g) | Total Pore Volume (cm³/g) (p/p°) | Wt. % Zn | mmoles Zn per gram | Color |
|---|---|---|---|---|---|
| Comparative Example 3 | 1190.5 | 0.487 (0.980) | 8.6 | 1.32 | Black |

TABLE 15

Characterization of metal-containing polymeric materials of Examples 19-24

| Example | Metal Chloride used to Prepare | $SA_{BET}$ (m²/g) | Total Pore Volume (cm³/g) (p/p°) | Wt. % Metal | mmoles Metal per gram | Color |
|---|---|---|---|---|---|---|
| Example 19 | $NiCl_2$ | 50.6 | 0.046 (0.980) | 20.8 | 3.54 | Tan |
| Example 20 | $CuCl_2$ | 61.1 | 0.087 (0.978) | 18.6 | 2.93 | Dark brown/gray |
| Example 21 | $MgCl_2$ | 88.8 | 0.107 (0.978) | 6.5 | 2.67 | White |
| Example 22 | $Zn(OAc)_2$ | 89.2 | 0.107 (0.979) | 15.8 | 2.42 | White |
| Example 23 | $Cu(NO_3)_2$ | 82.6 | 0.096 (0.978) | 19.4 | 3.05 | Gray/green |
| Example 24 | $CuSO_4$ | 72.8 | 0.093 (0.979) | 16.6 | 2.61 | Gray/green |

The metal-containing polymeric materials of Examples 19-24 were each individually sieved to 40×80 mesh size, and this material was used to perform the ammonia vapor test, as described above, to determine the ammonia capacity of each metal-containing polymeric material. The number of minutes each test lasted, the calculated mmoles/gram capacity and the final color of each metal-containing polymeric material at the end of the test are shown in Table 16.

The zinc-impregnated activated carbon of Comparative Example 3 was sieved to 40×80 mesh size, and this material was used to perform the ammonia vapor test, as described above, to determine the ammonia capacity of the zinc-impregnated activated carbon. The number of minutes the test lasted, the calculated mmoles/gram capacity and the final color of the zinc-impregnated activated carbon at the end of the test are shown in Table 18.

TABLE 18

Adsorption of ammonia by Comparative Example 3

| Example | Test Material Mass | Minutes Until 50 ppm Breakthrough | Capacity (mmoles/g) | Color at Test Completion |
|---|---|---|---|---|
| Comparative Example 3 | 0.0891 | 112 | 2.44 | Black |

Example 25

In a 2 L Parr stainless steel pressure vessel, 176.88 grams (1.36 moles) DVB (80 weight percent, tech grade), 240.04 grams (2.45 moles) of MA, and 4.18 grams (8.64 mmoles) of 2,2'-azobis(2,4-dimethylpentanenitrile) (VAZO 52) were dissolved in 417.68 grams of EtOAc. The polymerizable composition had 50.0 weight percent solids in EtOAc and contained a monomer mixture (33.9 weight percent DVB, 57.6 weight percent MA, and 8.5 weight percent styrene-type monomers) and 1 weight percent VAZO 52 (based on total weight of monomers). The polymerizable composition was bubbled with nitrogen for 15 minutes. The pressure vessel was then sealed and placed in a water bath at 60° C. The polymerizable composition was heated at this elevated temperature for 18 hours. A white precipitate that had formed was isolated by vacuum filtration and washed with EtOAc. The solid was placed in a 4 L Erylenmeyer flask and 2.0 L of EtOAc was added to the flask. The solid was allowed to stand in EtOAc for one hour at room temperature. The solid was again isolated by vacuum filtration and washed with EtOAc. The solid was placed in a 4 L Erylenmeyer flask and 2.0 L of EtOAc was added. The solid was allowed to stand in EtOAc overnight. The solid was again isolated by vacuum filtration and washed with EtOAc. The solid was then dried in a batch oven at 100° C. for 18 hours. This precursor polymeric material had a $SA_{BET}$ of 272.2 m$^2$/gram and a total pore volume of 0.450 cm$^3$/gram (p/p°) equal to 0.974) as determined by argon adsorption.

The non-hydrolyzed polymeric material was treated with a hydrolyzing agent (NaOH). More specifically, 323 grams (8.1 moles) of NaOH was dissolved in 2.69 L of deionized water within a 5 gallon plastic container. To this solution was added 274 grams of the above non-hydrolyzed polymeric material. The plastic container was sealed and placed on a jar roller. This suspension was rolled at room temperature for 18 hours. The solid was isolated by vacuum filtration and washed with deionized water. The solid was returned back to the 5 gallon container, and the jar was filled with 2.19 L of deionized water and 313 mL of concentrated HCl. The container was sealed and placed on a jar roller. This suspension was rolled at room temperature for 18 hours. The solid was again isolated by vacuum filtration and washed with deionized water. The solid was again isolated by vacuum filtration and washed with deionized water. The solid was then dried in an oven at 100° C. for 18 hours. This hydrolyzed polymeric material was sieved to 40×80 mesh size.

The dyed metal-containing polymeric material of Example 25 was prepared using an aqueous ZnCl$_2$/bromoxylenol blue solution. The following procedure was used to prepare Example 25. An aqueous solution of bromoxylenol blue was prepared in an 8 ounce jar by adding 163 milligrams (288 μmop of bromoxylenol blue to 163 mL of deionized water. The jar was put on a wrist shaker and was shaken at room temperature for two hours. The resulting suspension was filtered through a 1 micron glass frit filter (Pall Corporation, Port Washington, N.Y., USA) using a syringe to remove undissolved dye. The saturated dye solution was placed in a 32 ounce jar. To this solution was added 134 grams (981 mmoles) of ZnCl$_2$. Upon complete dissolution of the ZnCl$_2$, 20.0 grams of the 40×80 mesh size hydrolyzed polymeric material described above was added to the ZnCl$_2$/bromoxylenol blue solution. The jar was capped and placed on a jar roller. This suspension was then allowed to roll for 18 hours at room temperature. The solid was isolated by vacuum filtration without using additional deionized water to transfer or wash the material. The solid was dried in an oven at 100° C. for 18 hours.

The dyed metal-containing polymeric material of Example 25 was exposed to concentrated ammonium hydroxide (28-30 weight percent ammonia) in a test chamber consisting of a 1.2 L crystallizing dish containing 200 mL concentrated ammonium hydroxide. 100 milligrams of the dyed metal-containing polymeric material of Example 25 was placed in a 10 mL crystallizing dish and floated in the concentrated ammonium hydroxide. A glass plate was put over the large crystallizing dish. The color of the dyed metal-containing polymeric material of Example 25 was observed over time. After 15 minutes of exposure, the dyed metal-containing polymeric material had changed color. This test was repeated exactly as described above except that, instead of concentrated ammonium hydroxide, deionized water was placed in the 1.2 L crystallizing dish. After 30 minutes of exposure to just moisture, the dyed metal-containing polymeric material had changed color, but to a color different than the color change observed upon exposure to concentrated ammonium hydroxide. The dye used, the color before exposure, the color after exposure to ammonium hydroxide and the color after exposure to moisture of the dyed metal-containing polymeric material of Example 25 are shown in Table 19.

TABLE 19

Color changing properties of the dyed metal-containing polymeric material of Example 25 upon exposure to concentrated ammonium hydroxide or moisture.

| Example | Dye | Color Before Test | Color After Ammonia Exposure | Color After Moisture Exposure |
|---|---|---|---|---|
| Example 25 | Bromoxylenol blue | Lavender | Navy blue | Orange-brown |

We claim:
1. A metal-containing polymeric material comprising:
   a) a porous polymeric material comprising
      i) 15 to 65 weight percent of a first monomeric unit that is of Formula (I), Formula (II), or a mixture thereof;

(I)

(II)

ii) 30 to 85 weight percent of a second monomeric unit that is of Formula (III); and

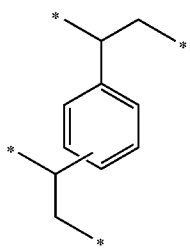

(III)

iii) 0 to 40 weight percent (or 5 to 40 weight percent) of a third monomeric unit that is of Formula (IV)

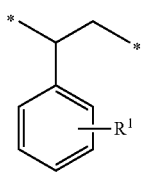

(IV)

wherein R¹ is hydrogen or alkyl; and b) a divalent metal incorporated into the polymeric material in an amount equal to at least 1.5 mmoles per gram of the polymeric material.

2. The metal-containing polymeric material of claim 1, wherein an amount of the divalent metal incorporated into the polymeric material is in a range of 1.5 to 15 mmoles per gram of the polymeric material.

3. The metal-containing polymeric material of claim 1, wherein the divalent metal is from a Group 2 metal or a Group 6 to 12 metal of the IUPAC Periodic Table of Elements.

4. The metal-containing polymeric material of claim 1, wherein the divalent metal is divalent zinc or copper.

5. The metal-containing polymeric material of claim 1, wherein the porous polymeric material comprises i) 40 to 60 weight percent monomeric units of Formula (I), Formula (II), or a mixture thereof, ii) 30 to 55 weight percent monomeric units of Formula (III), and 5 to 20 weight percent monomeric units of Formula (IV).

6. A metal complex-containing polymeric material comprising:

a) a porous polymeric material comprising i) 15 to 65 weight percent of a first monomeric unit that is of Formula (I), Formula (II), or a mixture thereof;

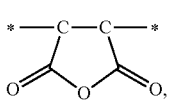

(I)

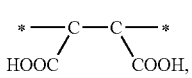

(II)

ii) 30 to 85 weight percent of a second monomeric unit that is of Formula (III); and

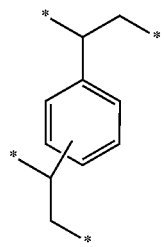

(III)

iii) 0 to 40 weight percent (or 5 to 40 weight percent) of a third monomeric unit that is of Formula (IV)

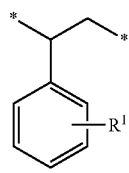

(IV)

wherein R¹ is hydrogen or alkyl; and b) a metal complex incorporated into the polymeric material, wherein the metal complex comprises a reaction product of i) a divalent metal; and ii) at least one basic, nitrogen-containing compound.

7. The metal complex-containing polymeric material of claim 6, wherein metal complex-containing polymeric material further comprises divalent metal that is not in the form of the metal complex.

8. The metal complex-containing polymeric material of claim 6, wherein a total amount of divalent metal is in a range of 1.5 to 15 mmoles per gram of the polymeric material.

9. The metal complex-containing polymeric material of claim 6, wherein the at least one basic, nitrogen-containing compound has a molecular weight no greater than 150 grams/mole.

10. The metal complex-containing polymeric material of claim 6, wherein the at least one basic, nitrogen-containing compound is ammonia, a hydrazine compound, an amine compound, or a nitrogen-containing heterocyclic compound.

11. A method of capturing a basic, nitrogen-containing compound, the method comprising:

providing a metal-containing polymeric material according to claim 1; and exposing the metal-containing polymeric material to a basic, nitrogen-containing compound to form a metal complex-containing polymeric material.

12. The method of claim 11, wherein the metal-containing polymeric material changes color upon exposing the metal-containing polymeric material to the basic, nitrogen-containing compound.

13. The method of claim 11, wherein a total amount of divalent metal is in a range of 1.5 to 15 mmoles per gram of the polymeric material.

14. The method of claim 11, wherein the compound of formula Q has a molecular weight no greater than 150 grams/mole.

15. The method of claim 11, wherein the metal-containing polymeric material sorbs an amount of the basic, nitrogen-containing compound in a range of 0.5 to 10 milliequivalents per gram of the metal-containing polymeric material.

* * * * *

UNITED STATES PATENT AND TRADEMARK OFFICE
CERTIFICATE OF CORRECTION

PATENT NO. : 10,400,050 B2
APPLICATION NO. : 15/570935
DATED : September 3, 2019
INVENTOR(S) : Michael S. Wendland It is certified that error appears in the above-identified patent and that said Letters Patent is hereby corrected as shown below:

On the Title Page

Page 2, Column 2
Item [56] Other Publications, Line 2, Delete "Divinylbezene"," and insert -- Divinylbenzene", --, therefor.

In the Specification

Column 12
Line 24, Delete "(2-methylproprionate))," and insert -- (2-methylpropionate)), --, therefor.
Line 44, Delete "PF6⁻, AsF6⁻, and SbF6⁻." and insert -- $PF_6^-$, $AsF_6^-$, and $SbF_6^-$. --, therefor.

Column 20
Line 28, Delete "triaalkylamines," and insert -- trialkylamines, --, therefor.

Column 27
Line 29, Delete "dime thylamine," and insert -- dimethylamine, --, therefor.
Line 32, Delete "ethanolamne," and insert -- ethanolamine, --, therefor.

Column 28
Line 57, Delete "ethanolamne," and insert -- ethanolamine, --, therefor.

Column 32
Lines 58, 60, 63, 65 and 67, Delete "pressure)" and insert -- pressure --, therefor.

Column 33
Lines 1, 2 and 13, Delete "pressure)" and insert -- pressure --, therefor.
Line 30, Delete "18-Me" and insert -- 18-MΩ --, therefor.

Signed and Sealed this
Fifth Day of November, 2019

Andrei Iancu
*Director of the United States Patent and Trademark Office*

CERTIFICATE OF CORRECTION (continued)
U.S. Pat. No. 10,400,050 B2

Column 35
Lines 24 and 61, Delete "(p/p°)" and insert -- (p/p° --, therefor.

Column 37
Line 41, Delete "(p/p°)" and insert -- (p/p° --, therefor.

Column 43
Line 1, Delete "(p/p°)" and insert -- (p/p° --, therefor.

Column 44
Lines 19 and 36, Delete "(p/p°)" and insert -- (p/p° --, therefor.
Line 60, Delete "millligrams" and insert -- milligrams --, therefor.

Column 47
Line 29, Delete "Erylenmeyer" and insert -- Erlenmeyer --, therefor.
Line 32, Delete "EtOAc for one hour at room temperature. The solid was again isolated by vacuum filtration and washed with EtOAc. The solid was placed in a 4 L Erylenmeyer flask and 2.0 L of EtOAc was added. The solid was allowed to stand in EtOAc overnight. The solid was again isolated by vacuum filtration and washed with EtOAc. The solid was then dried in a batch oven at 100° C. for 18 hours. This precursor polymeric material had a $SA_{BET}$ of 272.2 $m^2$/gram and a total pore volume of 0.450 $cm^3$/gram (p/p°) equal to 0.974) as determined by argon adsorption." and insert the same on Column 47, in Line 31 as a continuation of the same paragraph.
Line 34, Delete "Erylenmeyer" and insert -- Erlenmeyer --, therefor.
Line 40, Delete "(p/p°)" and insert -- (p/p° --, therefor.
Line 66, Delete "μmop" and insert -- μmol --, therefor.